(12) United States Patent
Kondoh et al.

(10) Patent No.: US 8,273,290 B2
(45) Date of Patent: Sep. 25, 2012

(54) COMPOSITE METAL MATERIAL AND METHOD FOR PRODUCING THE SAME

(75) Inventors: Katsuyoshi Kondoh, Minoh (JP); Bunshi Fugetsu, Sapporo (JP)

(73) Assignees: National University Corporation Hokkaido University, Hokkaido (JP); Katsuyoshi Kondoh, Osaka (JP)

( * ) Notice: Subject to any disclaimer, the term of this patent is extended or adjusted under 35 U.S.C. 154(b) by 333 days.

(21) Appl. No.: 12/739,175

(22) PCT Filed: Oct. 16, 2008

(86) PCT No.: PCT/JP2008/068746
§ 371 (c)(1),
(2), (4) Date: Apr. 22, 2010

(87) PCT Pub. No.: WO2009/054309
PCT Pub. Date: Apr. 30, 2009

(65) Prior Publication Data
US 2010/0261028 A1    Oct. 14, 2010

(30) Foreign Application Priority Data

Oct. 25, 2007    (JP) .................................. 2007-277505
Apr. 17, 2008    (JP) .................................. 2008-107881

(51) Int. Cl.
*C22C 1/10*    (2006.01)
*B22F 1/02*    (2006.01)
*B22F 3/24*    (2006.01)
*C01B 31/30*   (2006.01)

(52) U.S. Cl. ............... 419/14; 419/28; 419/31; 423/440

(58) Field of Classification Search .................... 419/14, 419/28, 30, 31, 35, 67; 423/440; 428/404; 427/216, 228
See application file for complete search history.

(56) References Cited

U.S. PATENT DOCUMENTS

| | | | | |
|---|---|---|---|---|
| 4,529,575 A | * | 7/1985 | Enomoto et al. | 423/345 |
| 5,368,812 A | * | 11/1994 | Calka et al. | 419/5 |
| 5,523,269 A | * | 6/1996 | Morgan et al. | 501/93 |
| 5,882,801 A | * | 3/1999 | Beardsley et al. | 428/570 |
| 2008/0023396 A1 | * | 1/2008 | Fugetsu | 210/502.1 |

FOREIGN PATENT DOCUMENTS

| | | |
|---|---|---|
| JP | 2005-200723 | 7/2005 |
| JP | 2006-265686 | 10/2006 |
| JP | 2007-154246 | 6/2007 |
| WO | 2005/110594 | 11/2005 |

OTHER PUBLICATIONS

C.S. Goh, et al., "Simultaneous enhancement in strength and ductility by reinforcing magnesium with carbon nanotubes", Materials Science and Engineering A 423 (2006) 153-156.

* cited by examiner

*Primary Examiner* — Roy King
*Assistant Examiner* — Ngoclan T Mai
(74) *Attorney, Agent, or Firm* — Clark & Brody

(57) ABSTRACT

A method for producing a composite metal material includes preparing a solution containing a surfactant having both hydrophilicity and hydrophobicity, dispersing a nanosized to micro-sized fine carbonaceous substance into a state of being monodispersed in the solution, bringing the solution having the dispersed fine carbonaceous substance into contact with surface of a metal powder particle, drying the metal powder particle to make the fine carbonaceous substance in the monodispersed state adhere to the surface of the metal powder particle via a component of the solution, and thermally decomposing and removing the solution component adhering to the surface of the metal powder particle by heat-treating the metal powder particle either in a hydrogen-containing reducing atmosphere or in a vacuum atmosphere to partially expose the surface of the metal powder particle out of the adhering fine carbonaceous substance, and thus progress diffusion and sintering among the metal powder particles through exposed parts.

8 Claims, 22 Drawing Sheets

(a) AZ31 (raw material) powder  (b) CNT

Raw material AZ31B magnesium alloy powder
(before soaked in CNT-dispersed solution)

M1-1

AZ31B magnesium alloy powder after soaked in CNT-dispersed solution (and dried): before heat treatment

M1-2

AZ31B magnesium alloy powder after soaked in CNT-dispersed solution
(and dried): before heat treatment

M1-3

AZ31B powder after soaked in CNT-dispersed solution (and dried) and subjected to heat treatment in atmosphere ( 480°C× 1 hr )

M1-4

AZ31B powder after soaked in CNT-dispersed solution (and dried) and subjected to heat treatment in atmosphere ( 550°C× 1 hr )

M1-5

AZ31B magnesium alloy powder after soaked in CNT-dispersed solution
(and dried): before heat treatment

M2-1

AZ31B powder after soaked in CNT-dispersed solution (and dried) and subjected to heat treatment in argon gas atmosphere ( 600°C× 1 hr )

M2-2

AZ31B powder after soaked in CNT-dispersed solution (and dried) and subjected to hydrogen heat treatment ( 600°C× 1 hr )

M2-3

AZ31B powder after soaked in CNT-dispersed solution (and dried) and subjected to hydrogen heat treatment ( 800°C× 1 hr )

M2-4

Cu powder after soaked in CNT-dispersed solution (and dried): before heat treatment

C-1

Cu powder after soaked in CNT-dispersed solution (and dried): before heat treatment

C-2

Cu powder after soaked in CNT-dispersed solution (and dried) and subjected to heat treatment in argon gas atmosphere ( 600°C× 1 hr )

Cu powder after soaked in CNT-dispersed solution (and dried) and subjected to heat treatment in argon gas atmosphere ( 600°C× 1 hr )

C-4

Cu powder after soaked in CNT-dispersed solution (and dried) and subjected to hydrogen heat treatment ( 600°C× 1 hr )

C-5

Cu powder after soaked in CNT-dispersed solution (and dried) and subjected to hydrogen heat treatment ( 600°C× 1 hr )

C-6

Cu powder after soaked in CNT-dispersed solution (and dried) and subjected to hydrogen heat treatment ( 800°C× 1 hr )

C-7

Cu powder after soaked in CNT-dispersed solution (and dried) and subjected to hydrogen heat treatment ( 800°C× 1 hr )

C-8

(a) AZ31 (CNT-coated) powder (b) AZ31 (CNT-mixed) powder (a)

(b) A      (c) B

Outer appearance of extruded CNT-coated AZ31B powder
(subjected to heat treatment at 480°C for one hour in hydrogen gas) (good shape)

Outer appearance of extruded CNT-coated AZ31B powder
(subjected to heat treatment at 480°C for one hour in atmosphere) (not solidified)

COMPOSITE METAL MATERIAL AND METHOD FOR PRODUCING THE SAME

TECHNICAL FIELD

The present invention relates to a composite metal material provided by sintering a compact body of composite metal powder particles each having a surface to which a nanosized to micro-sized fine carbonaceous substance adheres, and a method for producing the same.

BACKGROUND ART

Fine carbonaceous substances such as a carbon nanotube (CNT), carbon nanofiber, fullerene, and carbon black are superior in electric conductivity and thermal conductivity in addition to having lightweight, high-strength, and high-rigidity characteristics, so that it is expected to considerably improve physical characteristics of a metal material by uniformly dispersing them in a metal.

Conventionally, as a method to highly strengthen a metal represented by magnesium, it has been thought that a carbon nano-material is dispersed in a metal, for example.

For example, Japanese Unexamined Patent Publication No. 2007-154246 (patent document 1) discloses a technique to produce a composite powder by making a carbon nanomaterial adhere to a surface of a metal powder particle such as magnesium and aluminum through a mechanical alloying process and then pack and consolidate the composite powder.

Japanese Unexamined Patent Publication No. 2005-200723 (patent document 2) discloses a technique to disperse carbon nanofibers in a gel-like dispersion liquid provided by adding borax to a polyvinylalcohol aqueous solution, add a metal powder thereto and knead them, and obtain a carbon nanofiber-metal based material.

However, since the nanosized to micro-sized fine carbonaceous substance is likely to aggregate due to Van der Waals' force between carbon atoms, the fine carbonaceous substance cannot be uniformly dispersed onto the metal powder particle by the above method, so that it is difficult to dramatically improve characteristics of the metal material in a final stage.

One inventor of this application, FUGETSU disclosed in WO2005/110594A1 (patent document 3) that carbon nanotubes are successfully monodispersed in a solution, using amphiphilicity of a surfactant having hydrophilicity and hydrophobicity.

The other inventor of this application, KONDOH thought that the characteristics of the metal material can be dramatically improved by uniformly dispersing the carbon nanotubes in the metal material, using the above technique by FUGETSU. Thus, KONDOH and FUGETSU started a challenge, as collaborative study to produce a CNT-uniformly-dispersed alloy by making the carbon nanotubes uniformly adhere to a surface of a metal powder particle using the above technique by FUGETSU, and uniformly dispersing the carbon nanotubes in a metal or an alloy by a solid-phase reaction between composite metal powder particles.

At first, it was thought that a highly-strengthened metal material could be obtained in final stage just by soaking metal powder particles in the CNT dispersed solution produced by FUGETSU and making the CNTs adhere to a metal powder surface. However, the strength was not exactly improved.

As one of its reasons, it is thought that the CNTs adhere to the metal powder too much, and the metal powder particle surface is completely covered with the CNTs, which prevents the solid-phase reaction between the metal powder particles.

As another reason, it is thought that as the CNTs adhere to the metal powder surface via a component of a dispersion liquid (hereinafter referred to as the "binder"), the strength of the final metal material is lowered because of the presence of this binder component when the metal powder is heated to be solidified. When the binder is not completely removed, metallurgical combination (sintering) of the metal powder particles is prevented. Furthermore, when the metal powder particles are solidified with the binder remaining on the powder surface, the binder is thermally decomposed and generates a gas and the gas exists as a blister in the solidified metal material, which lowers the strength of the material.

In order to improve the characteristics of the final metal material, it is considered preferable that the CNTs adhere to the metal powder surface in a monodispersed state with the metal powder surface partially exposed. Alternatively, it is preferable to minimize a residual amount of the binder serving as an adhesive agent to make the CNTs adhere to the metal powder particle surface. In addition, it is necessary to find a condition to thermally decompose the binder.

DISCLOSURE OF THE INVENTION

It is an object of the present invention to provide a high-strength composite metal material having a dispersed fine carbonaceous substance such as a CNT, and a method for producing the same.

The composite metal material according to the present invention is produced by sintering a compact body of metal powder particles. The metal powder particle is covered with the fine carbonaceous substance having a size of nanometer to micrometer and dispersed in a monodispersed state, with its surface partially exposed. Diffusion and sintering between the metal powder particles are progressed at these exposed parts.

Here, the substance having the size of nanometer to micrometer means that the substance has a diameter of the order of $10^{-6}$ to $10^{-9}$ m, and a length of the order of $10^{-4}$ to $10^{-9}$ m (preferably, $10^{-6}$ to $10^{-9}$ m). The fine carbonaceous substance includes a carbon nanotube, carbon nanofiber, fullerene, and carbon black. The "monodispersed state" means that the fine carbonaceous substance is dispersed in an independent state but here, also means that it is dispersed in the form of a network.

According to the Japanese Unexamined Patent Publication No. 2007-154246 and the Japanese Unexamined Patent Publication No. 2005-200723, the fine carbonaceous substance was aggregated, and the fine carbonaceous substance could not adhere to the metal particle surface in the monodispersed state. Meanwhile, according to a preferred embodiment of the present invention, a fine carbonaceous substance is dispersed in the monodispersed state in a solution containing a surfactant having both hydrophilicity and hydrophobicity, and the solution is brought into contact with a surface of a metal powder particle, so that the fine carbonaceous substance can adhere to the metal particle surface without being aggregated. In this case, the fine carbonaceous substance adheres to the surface of the metal powder particle via a solution component of the surfactant having both hydrophilicity and hydrophobicity. In addition, the solution containing the surfactant having both hydrophilicity and hydrophobicity is described in detail in the WO2005/110594A1.

When a metal material is produced using the composite metal powder particles as a starting raw material, the fine carbonaceous substance is uniformly dispersed in the metal material, so that the metal material can be improved in strength.

Preferably, a material of the metal powder particle is a metal selected from a group composed of magnesium, copper, aluminum, and titanium or an alloy of them.

Preferably, the dispersed composite metal material contains the dispersed fine carbonaceous substance and dispersed metal carbide generated by reaction between the fine carbonaceous substance and the metal of the powder particle. According to one preferred embodiment, the metal powder particle includes titanium or a titanium alloy, and the metal carbide includes a titanium carbide. Preferably, 20 to 50% of the fine carbonaceous substance adhering to the metal powder particle surfaces react with the metal of the powder particles to generate the titanium carbide.

Preferably, in order to promote metallurgical combination (sintering) of the metal powder particles in a later process, the solution component of the surfactant adhering to the surface of the metal powder particle is removed by a reducing process in a hydrogen atmosphere. Furthermore, it is also preferable that the surface of the metal powder particle has an exposed part which is not covered with the fine carbonaceous substance with a view to promoting the metallurgical combination of the metal powder particles. As a method to implement the above, a concentration of the dispersion liquid is diluted as much as 100 times that of the conventional dispersion liquid.

The composite metal material may be produced by extruding the sintered material.

A method for producing a composite metal material according to the present invention includes a step of preparing a solution containing a surfactant having both hydrophilicity and hydrophobicity, a step of dispersing a nanosized to microsized fine carbonaceous substance into a state of being monodispersed in the solution, a step of bringing the solution having the dispersed fine carbonaceous substance into contact with a metal powder particle, a step of drying the metal powder particle to make the fine carbonaceous substance in the monodispersed state adhere to a surface of the metal powder particle via a component of the solution, and a step of thermally decomposing and removing the solution component adhering to the surface of the metal powder particle by heat-treating the metal powder particle either in a hydrogen-containing reducing atmosphere or in a vacuum atmosphere to partially expose the surface of the metal powder particle out of the adhering fine carbonaceous substance, and thus progress diffusion and sintering among the metal powder particles through exposed parts.

As specific methods to bring the solution in contact with the surface of the metal powder particle, the metal powder particles are soaked in the solution as one example, and the solution is sprayed toward the surface of the metal powder particle as the other example.

Preferably, the heat treatment or the reduction treatment is performed at 450° C. or higher. A material of the metal powder particle is a metal selected from a group composed of magnesium, copper, aluminum, and titanium or an alloy of them.

The method for producing the composite metal material may further includes a step of extruding a metal powder particle compact produced after progressing the diffusion and sintering.

Through the above heat treatment, a metal carbide may be generated by reacting a part of the fine carbonaceous substance adhering to the metal powder particle surface, with the metal of the powder particle. According to one embodiment, the metal powder particle includes titanium or a titanium alloy, and the metal carbide includes titanium carbide. Preferably, the heat treatment is performed under a condition selected to generate the titanium carbide with 20 to 50% of the fine carbonaceous substance adhering to the metal powder particle surface.

BEST MODE FOR CARRYING OUT THE INVENTION

[Outer Appearances of Magnesium Alloy (Az31B) Powder and Carbon Nanotubes]

Figure 1:
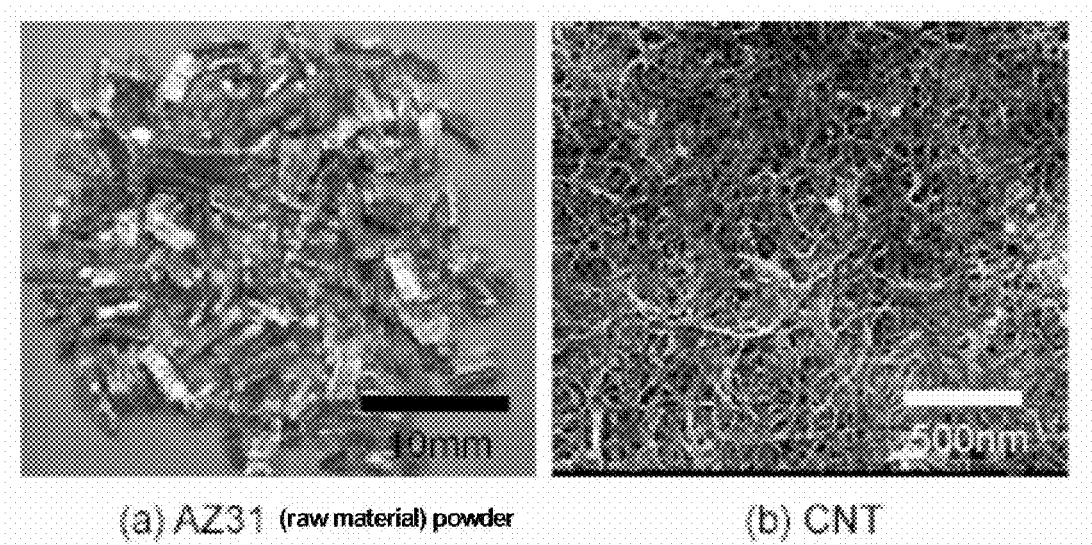
FIG. 1 is photographs showing an outer appearance of a magnesium alloy powder and an outer appearance of carbon nanotubes.

FIG. 1(*a*) is a photograph showing an outer appearance of a magnesium alloy powder (AZ31B) obtained from an AZ31B magnesium alloy ingot by machining, and FIG. 1(*b*) is a photograph showing an outer appearance of carbon nanotubes (CNTs: diameter is about 20 nm and length is 2 to 10 μm) used in this study.

[Preparation of Carbon Nanotube Dispersed Liquid]

(1A) First, 2.0 g of 3-(N,N-dimethylmyristylammonio)-propanesulfonate (zwitterionic surfactant produced by Fluka), 2.0 g of polyoxyetylene distyrenated phenyl ether (produced by Kao Corporation), 1.0 g of alkyl (14-18) dimethyl betaine (produced by Kao Corporation), and 400 ml of deionization water were mixed to prepare an aqueous solution to disperse carbon nanotubes.

(2A) Then, 20.2 to 20.5 g of carbon nanotubes (having a diameter of 20 nm and a length of 2 to 10 μm) were added to the aqueous solution obtained in the above process (1A) such that 500 ml of solution is obtained in the deionization water as a whole, and the solution was put into a ball mill body (cylindrical shape, inner volume=1800 ml, diameter of zirconium bead=50 to 150 mm, filled amount of beads=1200 g) and the ball mill body was put on a rotation table ("AS ONE" produced by Asahi-Rika Seisakusho Co., Ltd.) to gently stir the solution for eight hours, whereby a primary dispersion liquid (coarse dispersion liquid) containing the carbon nanotubes was produced.

(3A) The whole amount of the primary dispersion liquid containing the carbon nanotubes produced in the above process (2A) was taken out of the ball mill body, and subjected to a dispersion treatment in a bead mill ("DYNO-MILL" produced by WAB, cylindrical shape, inner volume=2000 ml, filled with 1800 g of zirconium beads having a diameter of 1.0 mm) at a flow rate of 1000 ml/min. for 30 to 60 minutes, whereby a secondary dispersion liquid of the carbon nanotubes was prepared (more than 96% of carbon nanotubes are dispersed in isolation, that is, in a monodispersed state).

[Process for Forming and Fixing Carbon Nanotube Net onto Metal Powder Particle Surface]

(1B) The secondary dispersion liquid of the carbon nanotubes obtained in the above process (3A) was well mixed with metal powder particles (whose shape is not limited in particular, but it is especially desirable that a base material has a shape having a large-specific surface area such as a spherical or particulate shape) and then water was evaporated gradually (at a temperature of 80° C. to 110° C.) or instantaneously (spray drying at a temperature of 200 to 280° C.). In the process for removing the water from the dispersion liquid, the monodispersed carbon nanotubes transferred from a phase (liquid phase or aerosol) of the dispersion liquid to a surface (solid phase) of the metal powder particle. As a result, while the carbon nanotubes were kept in the monodispersed state, they formed a net connected densely on the surface of the metal powder particle, so that they were fixed onto the surface of the metal powder particle while keeping the monodispersed state.

(2B) A carbon nanotube amount fixed onto the surface of the metal powder particle can be changed by changing a concentration of the carbon nanotubes in the secondary dispersion liquid, or an absolute amount of the dispersion liquid used in the above process (1B). More specifically, composite metal powder particles composed of the metal powder particles/carbon nanotubes can be adjusted to have the following ratio.

(3B) That is, 900 ml of the secondary dispersion liquid of the carbon nanotubes (CNTs concentration; 1.5%) obtained in the above process (3A) was well mixed with 307.2 g of a AZ31B magnesium alloy powder (having a diameter of 150 to 250 μm), and stilly left overnight in a thermostat bath at 80° C. and water in the dispersion liquid was evaporated gradually. Through this process, magnesium alloy powder particles having the carbon nanotube nets were made. The ratio of magnesium/carbon nanotubes was 307.2/13.5=22.8/1.

Figure 2:
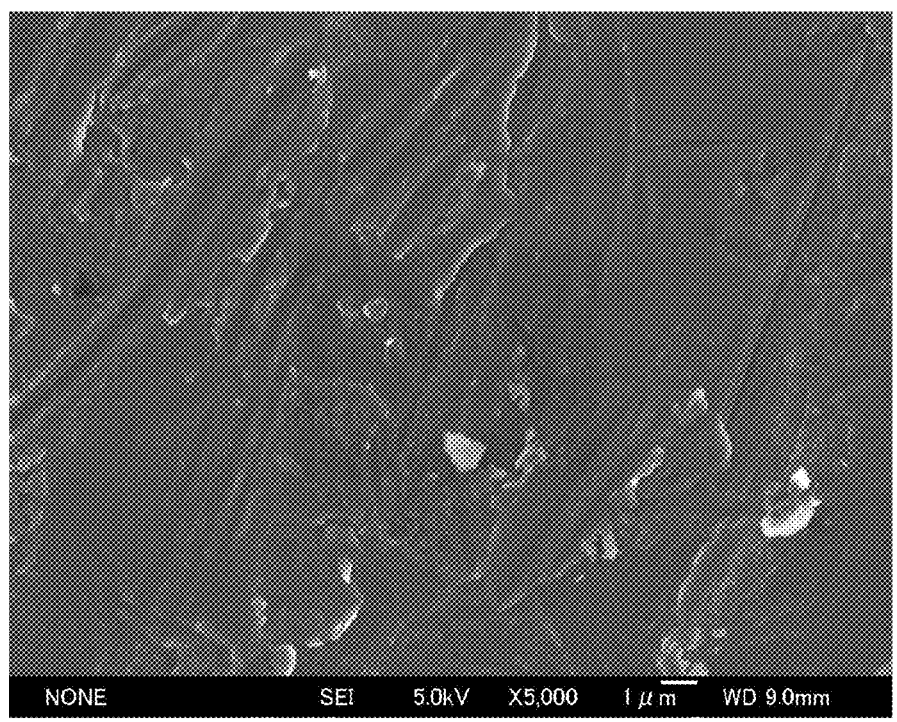
FIG. 2 is a photograph showing a surface of a raw material AZ31B magnesium alloy powder particle before soaked in a CNT dispersed solution.

FIG. 2 is a photograph showing a surface of a raw material AZ31B magnesium alloy powder particle (M1-1) before soaked in the CNT dispersed solution.

Figure 3:
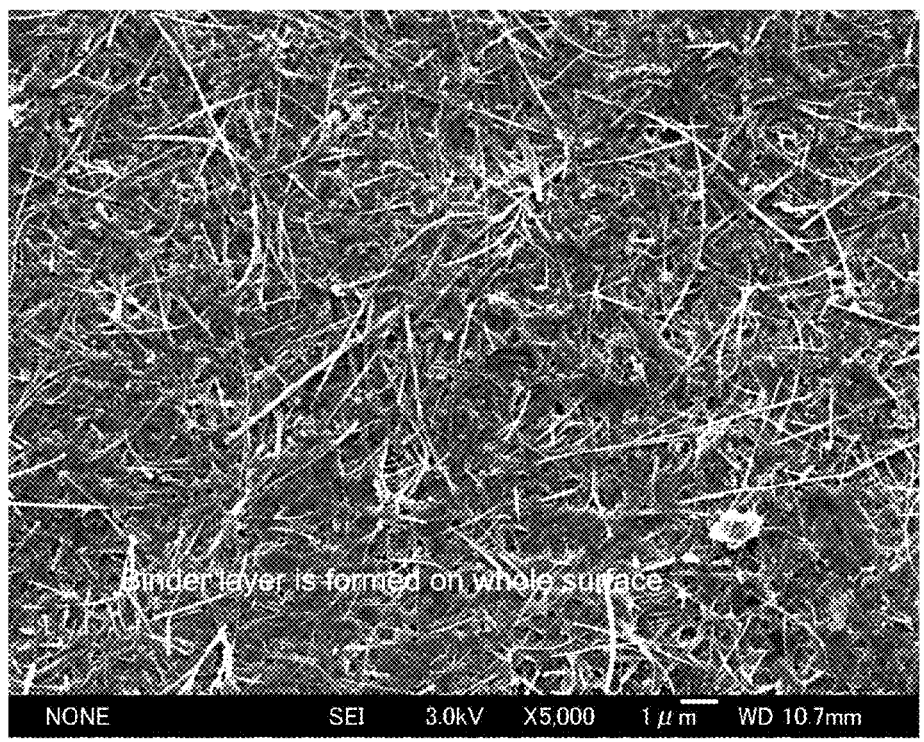
FIG. 3 is a photograph showing a surface of a AZ31B magnesium alloy powder particle after soaked in the CNT dispersed solution and dried.

FIG. 3 is a photograph showing a surface of a AZ31B magnesium alloy powder particle (M1-2) after soaked in the CNT dispersed solution and dried. The one which looks a needle is the CNT, and the surface of the powder particle is densely covered with them. That is, the CNTs are not aggregated but kept in the monodispersed state.

Figure 4:
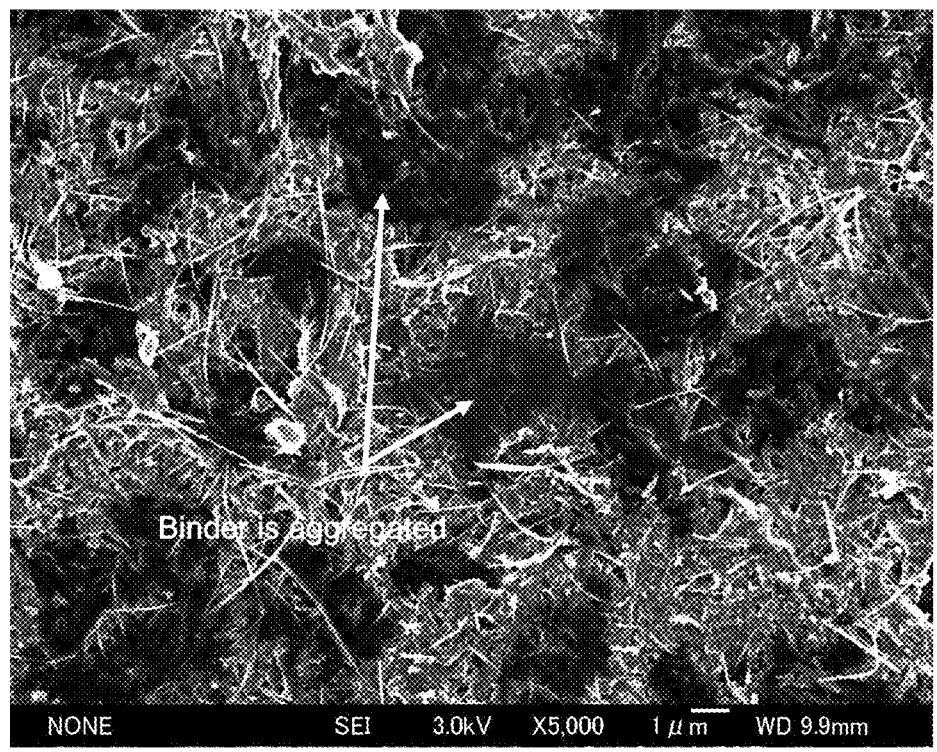
FIG. 4 is a photograph showing a surface of a AZ31B magnesium alloy powder particle after soaked in the CNT dispersed solution and dried.

FIG. 4 is a photograph showing a surface of the same powder particle (M1-3) as the above AZ31B magnesium alloy powder particle (M1-2). Because a binder (surfactant component) is high in concentration, it is partially aggregated. The CNTs are not aggregated but kept in the monodispersed state.

Figure 5:
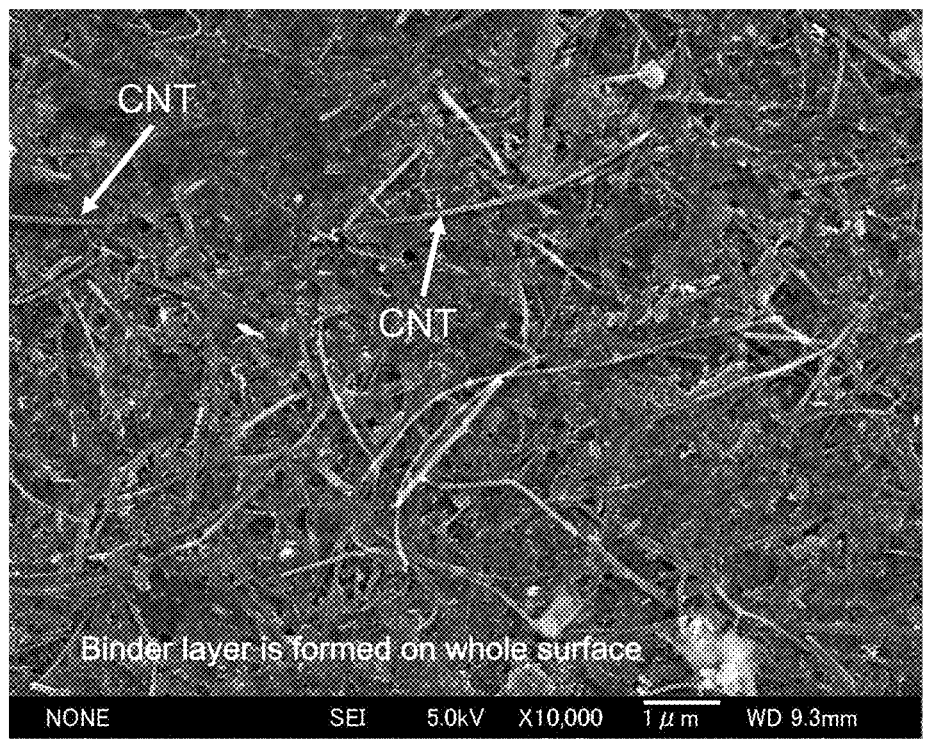
FIG. 5 is a photograph showing a surface of a AZ31B magnesium alloy powder particle after soaked in the CNT dispersed solution and dried and subjected to a heat treatment at 480° C. for one hour in the atmosphere.

FIG. 5 is a photograph showing a surface of a powder particle (M1-4) after the above AZ31B magnesium alloy powder particles (M1-2) were subjected to a heat treatment at 480° C. for one hour in the atmosphere. A binder (surfactant component) covers the powder particle surface in the form of a layer. In this case also, the CNTs are kept in the monodispersed state.

Figure 6:
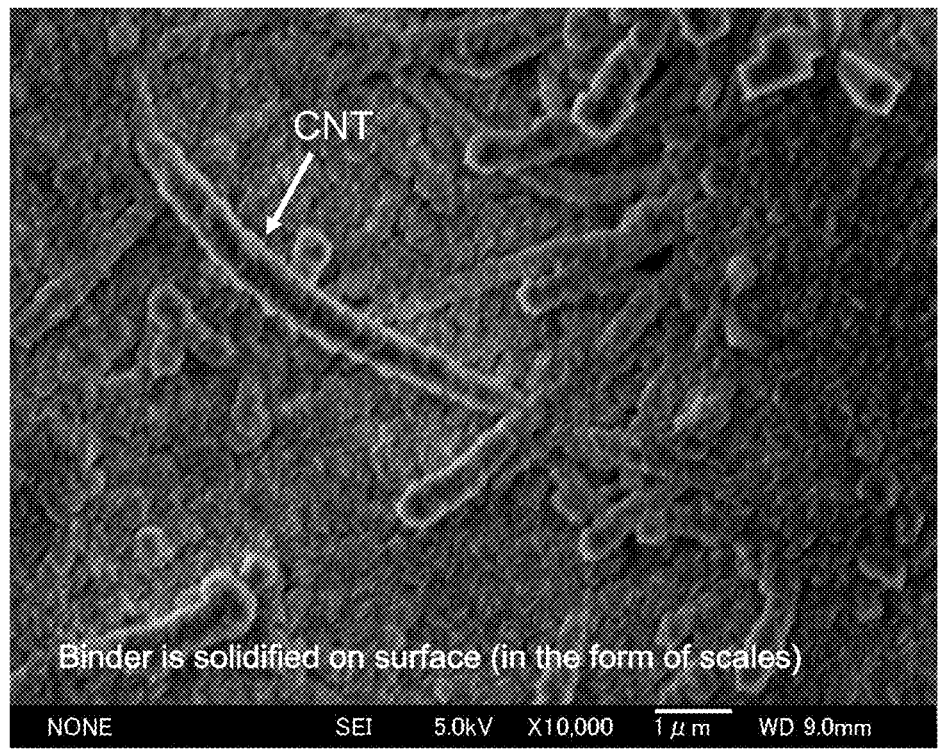
FIG. 6 is a photograph showing a surface of a AZ31B magnesium alloy powder particle after soaked in the CNT dispersed solution and dried and subjected to a heat treatment at 550° C. for one hour in the atmosphere.

FIG. 6 is a photograph showing a surface of a powder particle (M1-5) after the above AZ31B magnesium alloy powder particles (M1-2) were subjected to a heat treatment at 550° C. for one hour in the atmosphere. A binder (surfactant component) covers the powder particle surface in the form of fine scales. The CNTs are altered because of being heated and held in the atmosphere at high temperature.

(4B) In addition, 900 mL of aqueous solution (CNTs concentration; 0.15%) was prepared by diluting the secondary dispersion liquid of the carbon nanotubes obtained in the above process (3A) 100 times with deionization water, and 307.2 g of AZ31B magnesium alloy powder used in the above process (3B) was added thereto and mixed well and soaked therein for three hours and taken out and dried in the atmosphere. At this time, a ratio of magnesium/carbon nanotubes was 307.2/0.135=2280/1.

Figure 7:
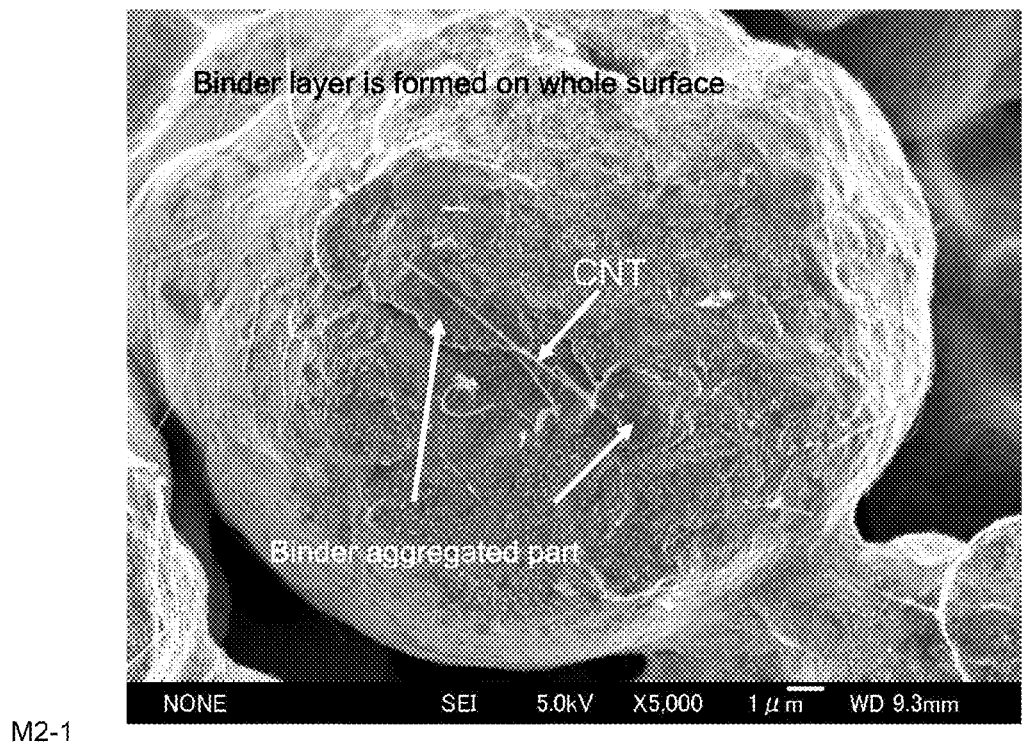
FIG. 7 is a photograph showing a surface of a AZ31B magnesium alloy powder particle after soaked in the CNT dispersed solution and dried.

FIG. 7 is a photograph showing a surface of a AZ31B magnesium alloy powder particle (M2-1) after soaked in the CNT dispersed solution and then dried. This photograph shows a state before heat treatment. The one which looks a needle is the CNT. Since the dispersion solution was diluted 100 times, the CNTs are clearly isolated and monodispersed. The CNTs are not aggregated, but the binder (surfactant component) covers the whole surface of the powder particles, and is partially aggregated in the form of scales.

Figure 8:
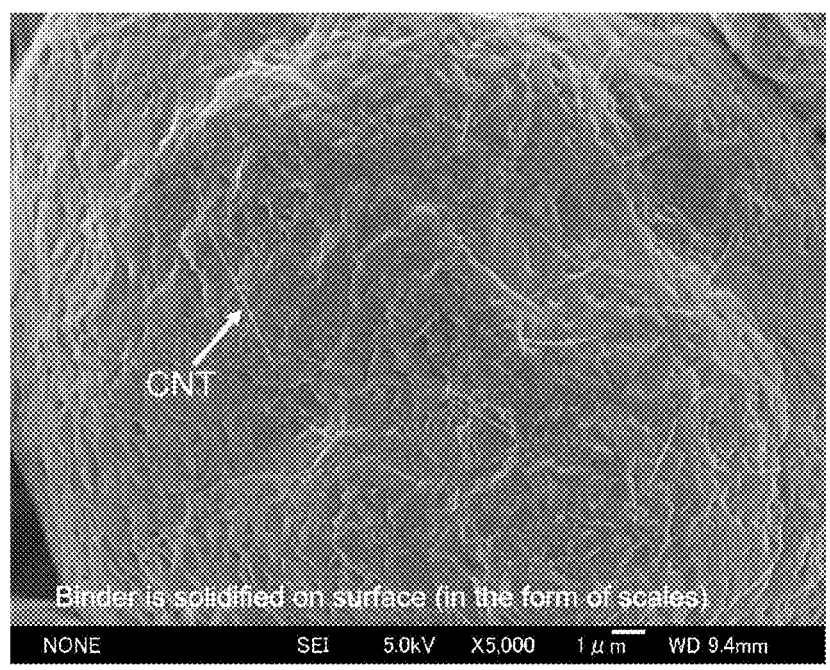
FIG. 8 is a photograph showing a surface of a AZ31B magnesium alloy powder particle after soaked in the CNT dispersed solution and dried and subjected to a heat treatment at 600° C. for one hour in an argon gas atmosphere.

FIG. 8 is a photograph showing a surface of a powder particle (M2-2) after the above AZ31B magnesium alloy powder particles (M2-1) were subjected to a heat treatment at 600° C. for one hour in an argon gas atmosphere. The binder (surfactant component) uniformly covers the whole surface of the powder particle in the form of fine scales. The CNTs are kept in the monodispersed state.

Figure 9:
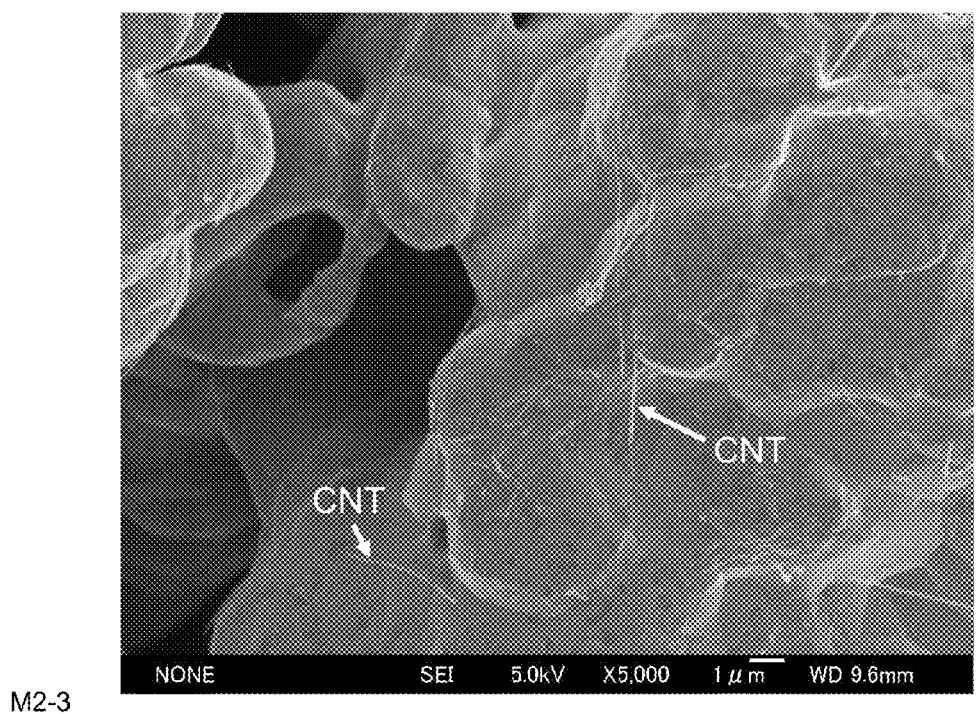
FIG. 9 is a photograph showing a surface of a AZ31B magnesium alloy powder particle after soaked in the CNT dispersed solution and dried and subjected to a heat treatment at 600° C. for one hour in a hydrogen gas atmosphere.

FIG. 9 is a photograph showing a surface of a powder particle (M2-3) after the above AZ31B magnesium alloy powder particles (M2-1) were subjected to a heat treatment at 600° C. for one hour in a hydrogen gas atmosphere. The binder (surfactant component) does not remain on the surface of the powder particle and the powder particle is exposed. The CNTs are kept in the monodispersed state.

Figure 10:
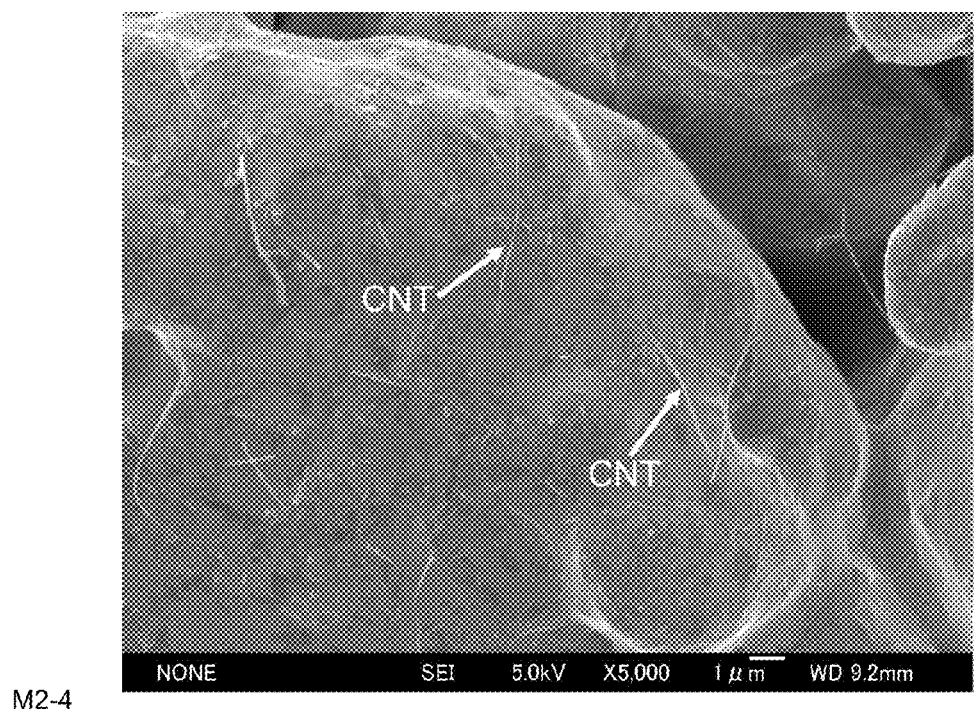
FIG. 10 is a photograph showing a surface of a AZ31B magnesium alloy powder particle after soaked in the CNT dispersed solution and dried and subjected to a heat treatment at 800° C. for one hour in a hydrogen gas atmosphere.

FIG. 10 is a photograph showing a surface of a powder particle (M2-4) after the above AZ31B magnesium alloy powder particles (M2-1) were subjected to a heat treatment at 800° C. for one hour in a hydrogen gas atmosphere. Similar to the (M2-3), the binder (surfactant component) does not remain on the surface of the powder particle and the powder particle is exposed. The CNTs are kept in the monodispersed state.

(5B) In addition, 100 mL of aqueous solution (CNTs concentration; 0.15%) was prepared by diluting the secondary dispersion liquid of the carbon nanotubes obtained in the above process (3A) 100 times with deionization water, and 10 g of pure copper powder (having an average particle diameter of 36.7 µm) was added thereto and mixed well and soaked therein for two hours and taken out and dried in the atmosphere. At this time, a ratio of copper/carbon nanotubes was 10/0.135=74/1.

Figure 11:
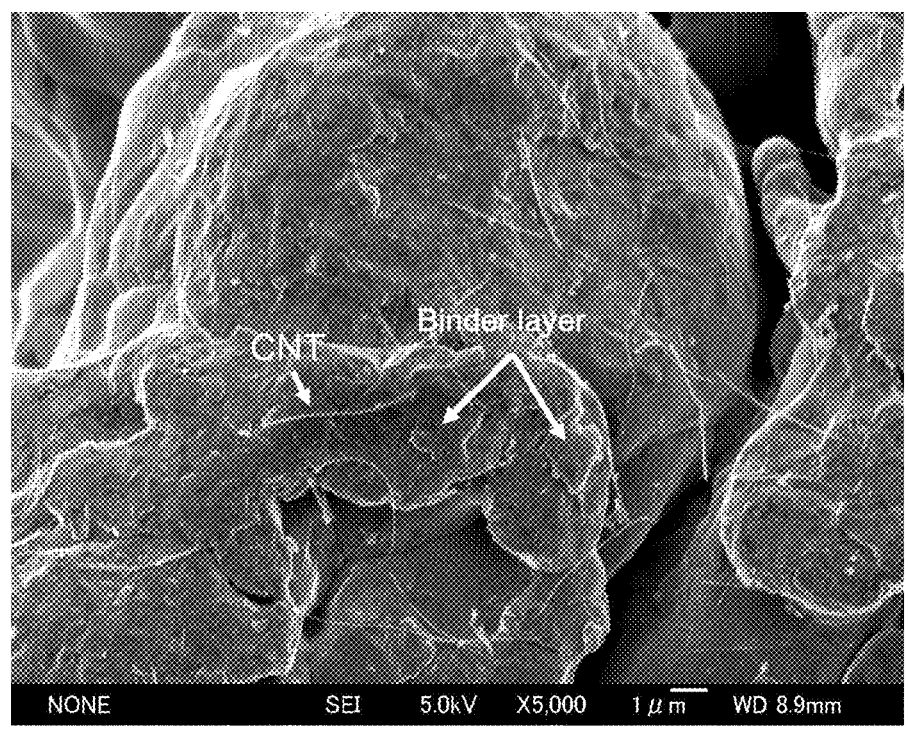
FIG. 11 is a photograph showing a surface of a pure copper powder particle after soaked in the CNT dispersed solution and dried.
Figure 12:
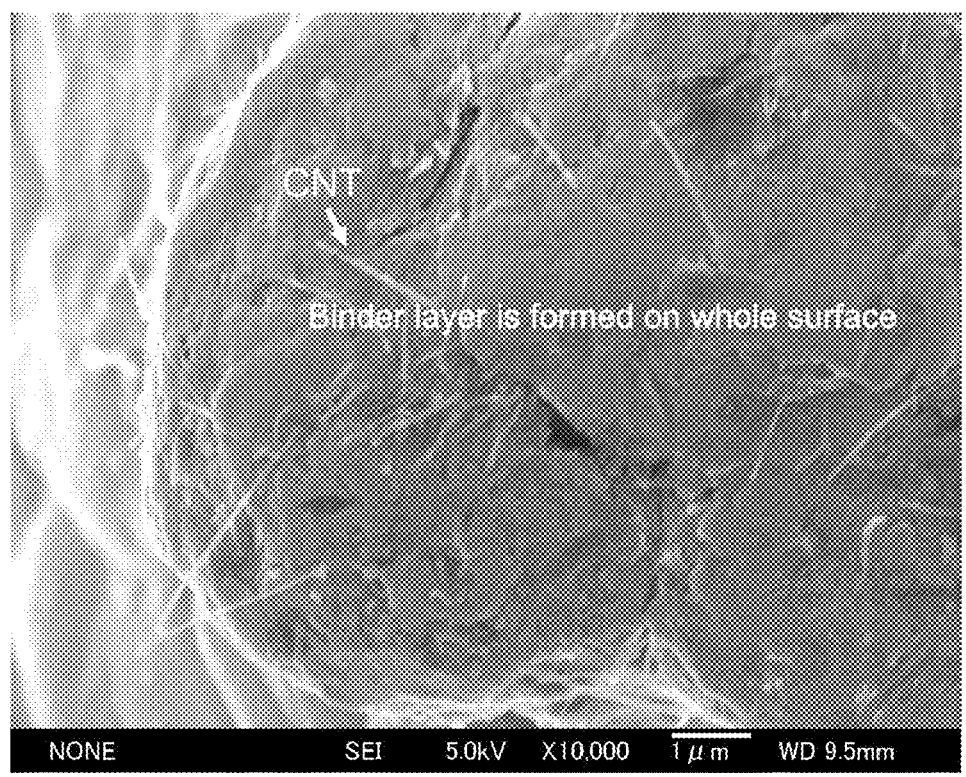
FIG. 12 is a photograph showing a surface of a pure copper powder particle after soaked in the CNT dispersed solution and dried.

FIGS. 11 and 12 are photographs showing surfaces of pure copper powder particles (C-1 and C-2) after soaked in the CNT dispersed solution and then dried. The one which looks like a needle is the CNT. Since the dispersed solution was diluted 100 times, the CNTs are clearly isolated and monodispersed. The CNTs are not aggregated, but the binder (surfactant component) covers the whole surface of the powder particle in the form of a layer, and is partially aggregated in the form of scales.

Figure 13:
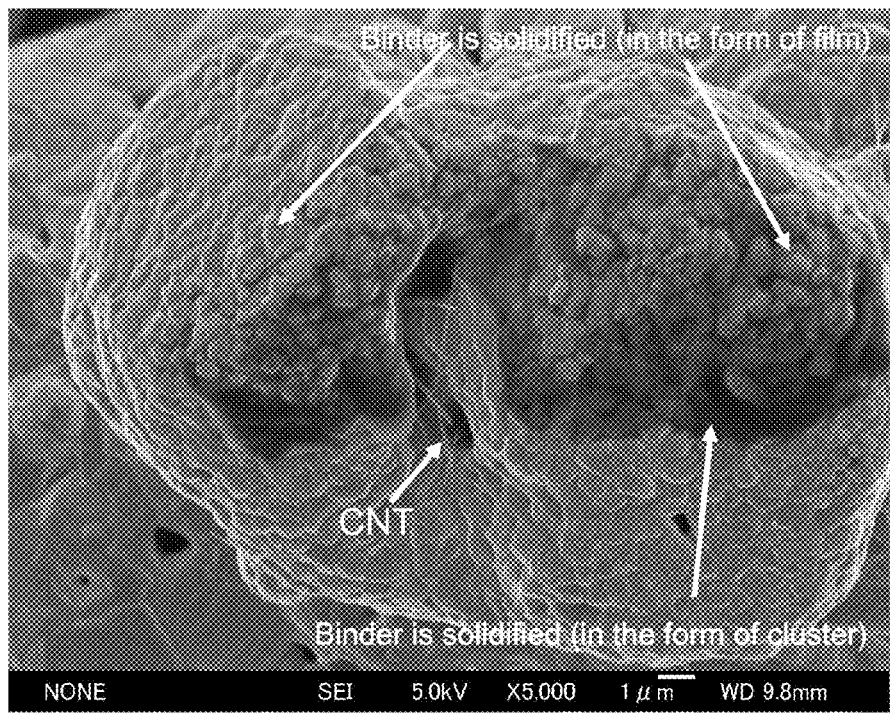
FIG. 13 is a photograph showing a surface of a pure copper powder particle after soaked in the CNT dispersed solution and dried and subjected to a heat treatment at 600° C. for one hour in an argon gas atmosphere.
Figure 14:
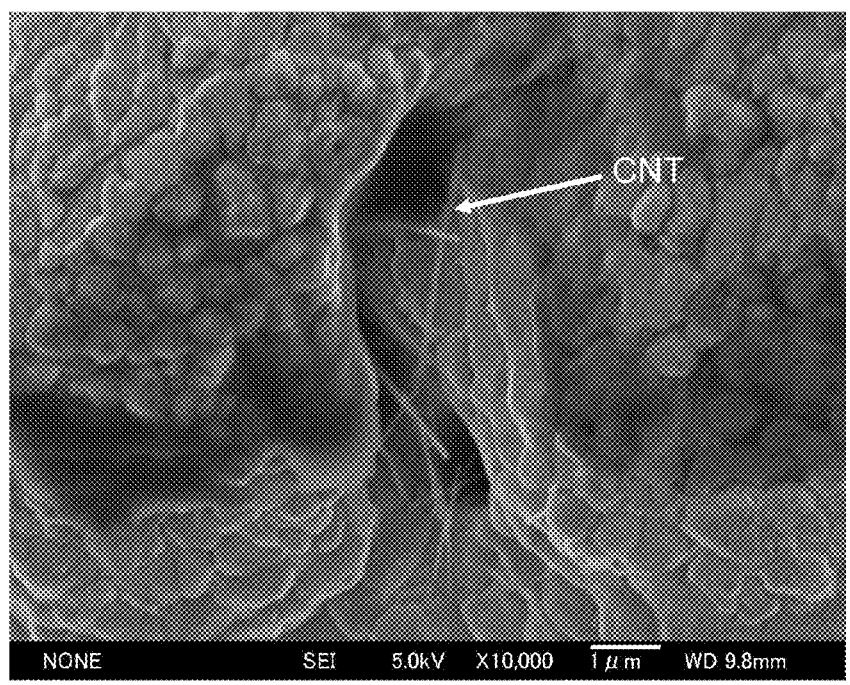
FIG. 14 is a photograph showing a surface of a pure copper powder particle after soaked in the CNT dispersed solution and dried and subjected to a heat treatment at 600° C. for one hour in an argon gas atmosphere.

FIGS. 13 and 14 are photographs showing surfaces of powder particles (C-3 and C-4) after the pure copper powder particles (C-1) were subjected to a heat treatment at 600° C. for one hour in an argon gas atmosphere. The binder (surfactant component) uniformly covers the whole surface of the powder particle in the form of fine clusters. The binder is partially condensed in the form of a film and solidified. In this case also, the CNTs are kept in the monodispersed state.

Figure 15:
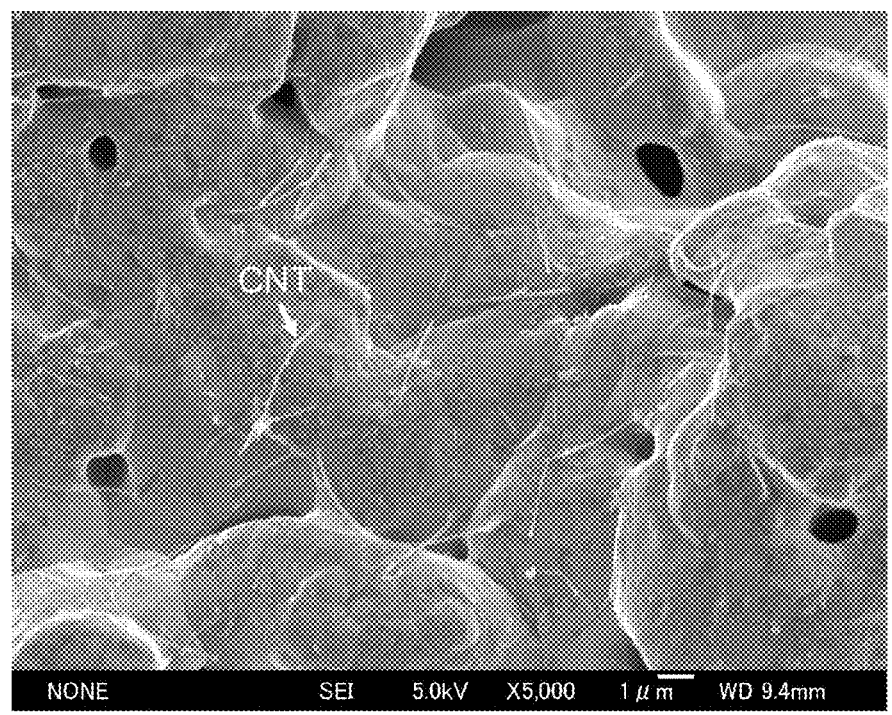
FIG. 15 is a photograph showing a surface of a pure copper powder particle after soaked in the CNT dispersed solution and dried and subjected to a heat treatment at 600° C. for one hour in a hydrogen atmosphere.
Figure 16:
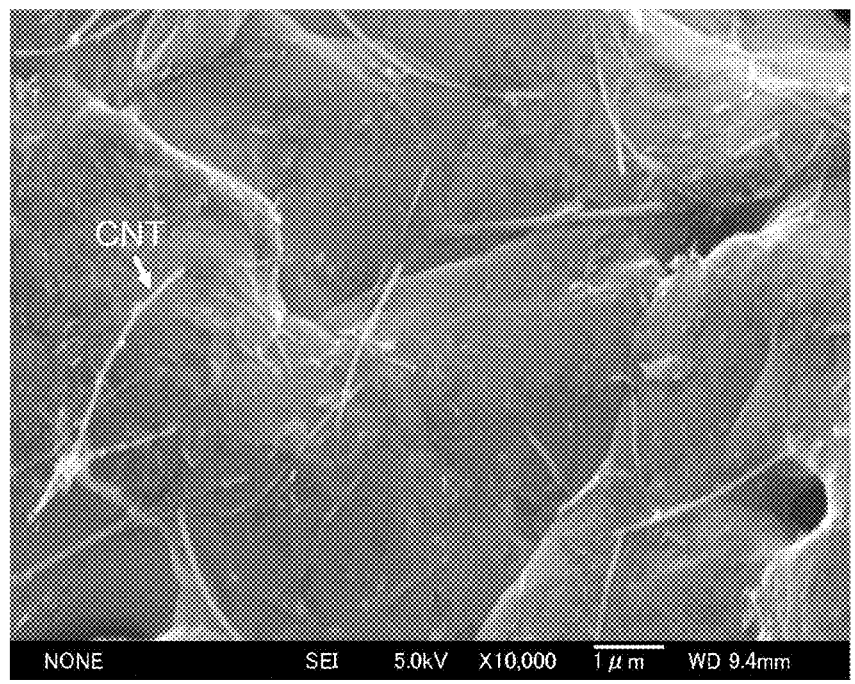
FIG. 16 is a photograph showing a surface of a pure copper powder particle after soaked in the CNT dispersed solution and dried and subjected to a heat treatment at 600° C. for one hour in a hydrogen atmosphere.

FIGS. 15 and 16 are photographs showing surfaces of powder particles (C-5 and C-6) after the pure copper powder particles (C-1) were subjected to a heat treatment at 600° C. for one hour in a hydrogen atmosphere. The binder (surfactant component) does not remain on the surface of the powder particle and the powder particle is exposed. In this case also, the CNTs are kept in the monodispersed state. In addition, the copper powder particles are progressively diffused and sintered because of being heated in the hydrogen atmosphere, and a spherical void is observed at triple points (former powder boundary) of the powder.

Figure 17:
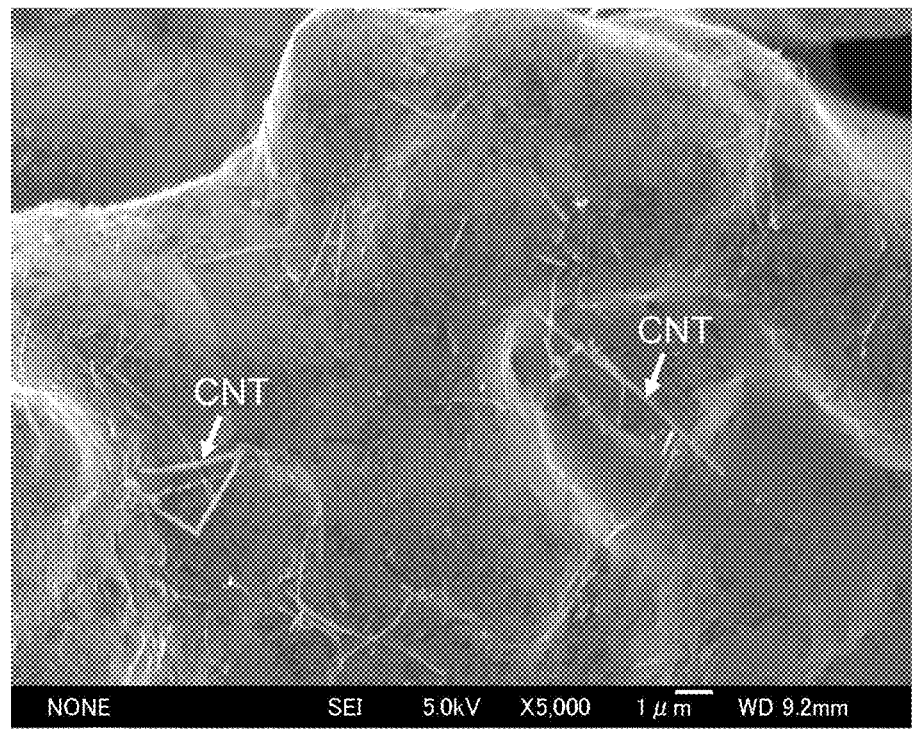
FIG. 17 is a photograph showing a surface of a pure copper powder particle after soaked in the CNT dispersed solution and dried and subjected to a heat treatment at 800° C. for one hour in a hydrogen atmosphere.
Figure 18:
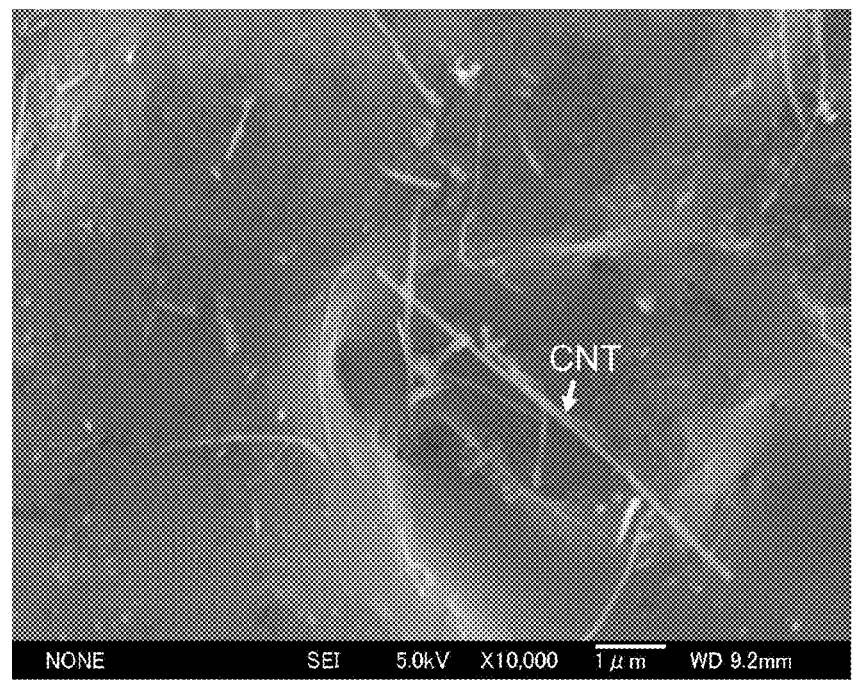
FIG. 18 is a photograph showing a surface of a pure copper powder particle after soaked in the CNT dispersed solution and dried and subjected to a heat treatment at 800° C. for one hour in a hydrogen atmosphere.

FIGS. 17 and 18 are photographs showing surfaces of powder particles (C-7 and C-8) after the pure copper powder particles (C-1) were subjected to a heat treatment at 800° C. for one hour in a hydrogen atmosphere. The binder (surfactant component) does not remain on the surface of the powder particle and the powder particle is exposed. In this case also, the CNTs are kept in the monodispersed state.

[Result of Analysis on Residual Amount of Carbon (Binder) Due to Heat Treatment in Hydrogen Reducing Atmosphere]

A residual amount of carbon was analyzed with respect to a sample prepared by a process in which the AZ31B magnesium powder was soaked in the aqueous solution (obtained in the process (1A)) only containing the zwitterionic surfactant, dried, and subjected to a heat treatment in the atmosphere and a heat treatment in a hydrogen reducing atmosphere. The result is as follows.

(1) AZ31B raw material powder (before soaked in the aqueous solution); 0.003 wt %
(2) AZ31B magnesium alloy powder soaked in the aqueous solution and dried; 0.013 wt %
(3) Powder provided after the powder (2) was subjected to a heat treatment at 550° C. for one hour in the atmosphere; 0.008 wt %
(4) Powder provided after the powder (2) was subjected to a heat treatment at 550° C. for one hour in the hydrogen atmosphere; 0.002 wt %

From the above result of analysis, it is found that the binder component is completely dissolved and does not remain on the surface of the powder particle by performing the heat treatment in the hydrogen reducing atmosphere (4). Meanwhile, as for the heat treatment in the atmosphere (3), since the carbon content is less than that of the coated powder (2), it is thought that the binder component is decomposed to a certain extent, but since the residual carbon content is more than that of the powder (4) of the treatment in the hydrogen reducing atmosphere, it is found that the carbon is left on the surface of the AZ31B powder particle. Such residual binder film hinders the sintering property of the AZ31b powder and lowers the mechanical characteristics of an extruded material.

[Comparison Between Different Methods for Adhesion of CNTS]

To coat the AZ31B magnesium alloy powder particles with the CNTs, two following methods were used and compared.
(1) Method for Soaking in Aqueous Solution Containing Zwitterionic Surfactant First, 98.3 g of AZ31B raw material powder was poured in a container containing 300 ml of aqueous solution in which the CNTs are monodispersed (CNTs content; 1% w/v), and the container was put in a thermostat both set at 80° C. While water in the container evaporates, the monodispersed CNTs transfered from the aqueous solution onto the AZ31B raw material powder particle, and formed a network structure of the CNTs (simply referred to as the CNT net) on the surface. As a result, the CNTs were fixed onto the surface of the raw material powder particle in the monodispersed state. The composite powder made as described above is referred to as the "AZ31 (CNT-coated)".

(2) Simple Mixing Method

The CNT powder was simply mixed with the AZ31B raw material powder (referred to as the AZ31 (raw material)). This mixed powder is referred to as the "AZ31 (CNT-mixed)".

(3) Comparison Between Outer Appearances of Powders

Figure 19:
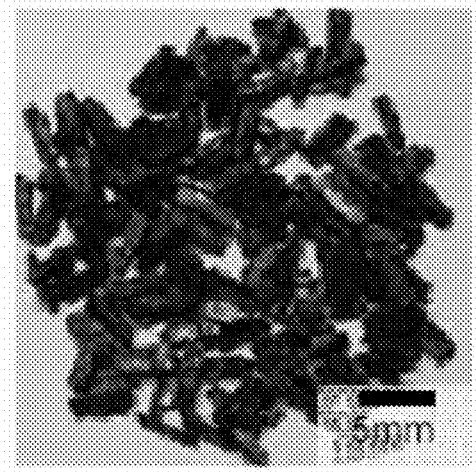
FIG. 19 are photographs showing an outer appearance of a AZ31 (CNT-coated) powder and an outer appearance of a AZ31 (CNT-mixed) powder.
Figure 19:
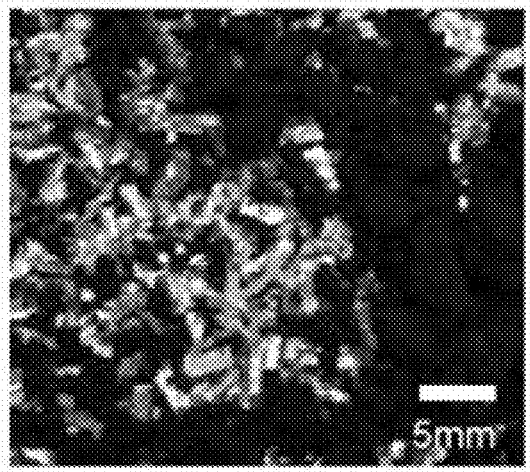

FIG. 19(a) shows an outer appearance of the AZ31 (CNT-coated) powder, and FIG. 19(b) shows an outer appearance of AZ31 (CNT-mixed) powder. In the case of the AZ31 (CNT-mixed) powder, the CNTs are aggregated and they are separated from the AZ31 (raw material) powder. On the other hand, in the case of the AZ31 (CNT-coated) powder, the whole surface presents a black appearance, and it is thought that the CNTs uniformly adhere thereto. In addition, it has been confirmed that the CNTs are not removed in a normal handling process.

(4) Adhesion state of CNTs on AZ31 (CNT-coated) powder

Figure 20:
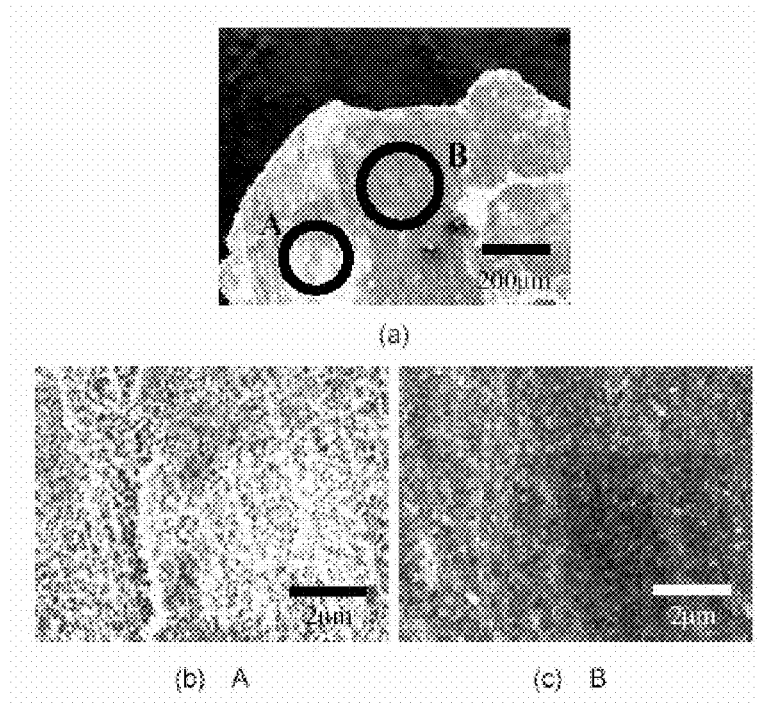
FIG. 20 is a photograph showing a surface of a AZ31 (CNT-coated) powder particle observed under a SEM.

FIG. 20 shows a result of SEM observation of the surface of the AZ31 (CNT-coated) powder particle. In FIG. 20(a), a white part A and a black region B are confirmed. After observing them at high magnification, it is thought that the part A is white because a solid component amount of the solution existing in the region A is larger than that in the region B. Here, it is to be noted that, as shown in FIGS. 20(b) and 20(c), in each region, the CNTs are not aggregated but cover the powder particle surface in the monodispersed state, and the CNTs have the net shape (network structure). As a result, it has been found that when the CNTs monodispersed in the solution adhere onto the AZ31B raw material powder, the CNTs can be uniformly dispersed onto the dried powder particle surface also without forming an aggregate.

[Investigation of Decomposition Temperature of Adhering Component]

The CNTs adhere to the AZ31B powder surface via the solution component of the surfactant, and the above component is thermally decomposed in the processing and heat treatments at the time of solidification of the powder. At this time, the characteristics could be lowered because the component remains as a carbon residual or gas. Thus, in order to investigate a thermal decomposition process, the CNT film on the surface was collected and heated to 973K in an argon atmosphere in a thermogravimetry instrument (DTG-60 produced by Shimadzu Corporation) to investigate a decomposition temperature of the adhering component.

Figure 21:
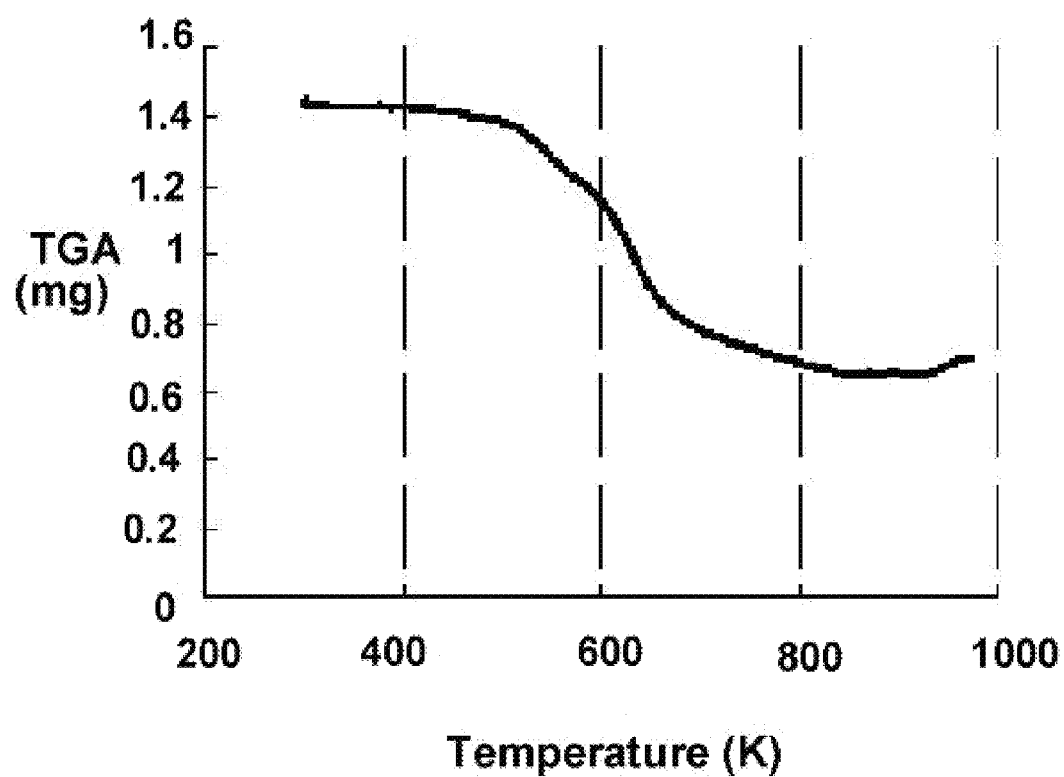
FIG. 21 is a view showing a result of TGA for a CNT-coated film cut from the AZ31B (CNT-coated) powder particle surface.

FIG. 21 shows a TGA result of the CNT-coated film cut from the AZ31B (CNT-coated) powder particle surface. Considerable decrease in weight is confirmed within a temperature range of about 523 K to 723 K, and it is believed that the solution component has been thermally decomposed in this range. In other words, when the CNT composite Mg powder produced this time is solidified, it is preferable to control a condition such that the solution component is decomposed and does not remain in the material by heating to a temperature higher than 723 K.

[Formability of Powder Compact]

The AZ31B (raw material) powder, the AZ31B (CNT-coated) powder, and the AZ31B (CNT-mixed) powder were compacted at room temperature in a hydraulic press molding machine, and each formability was evaluated. Under the condition that a container inner diameter was φ34 mm, and a pressure was 600 MPa, the AZ31B (raw material) powder and the AZ31B (CNT-mixed) powder were solidified to be about 30 mm in whole length, and the AZ31B (CNT-coated) powder was solidified to be about 25 mm in whole length, and the outer appearance of each powder compact was observed.

Figure 22:
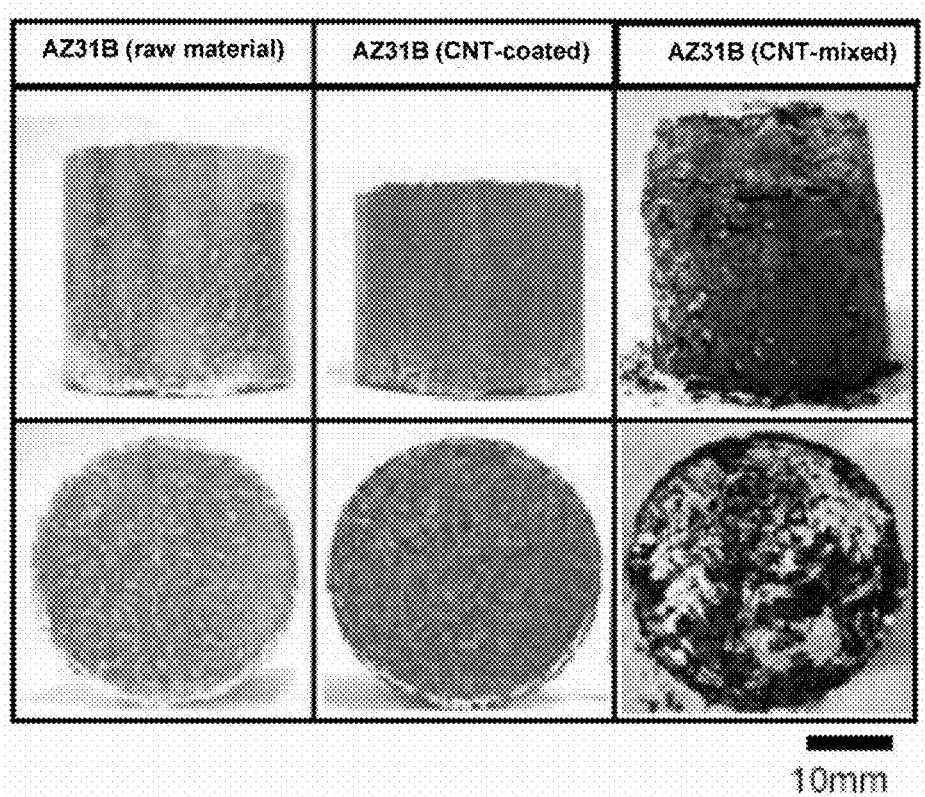
FIG. 22 are photographs showing outer appearances of powder compacts made of a AZ31B (raw material) powder, a AZ31B (CNT-mixed) powder, and a AZ31B (CNT-coated) powder.

FIG. 22 shows the outer appearances of the AZ31B (raw material) powder, the AZ31B (CNT-mixed) powder, and the AZ31B (CNT-coated) powder. As for the AZ31B (CNT-mixed) powder compact made by the conventional mechanical mixing method, the aggregate of the CNTs is confirmed on the surface, and it is observed that its handling property is no good, and it is cracked even by a low impact. In addition, the whole length of the sample is 40 mm while a theoretical length is 30 mm, and the powder compact has many voids inside, so that its formability is regarded as inferior. Meanwhile, the powder compact made of the AZ31B (CNT-coated) powder has no crack and no damage on its pressed surface and side surface, and the whole powder compact presents thick gray color because there is no aggregate of the CNTs, and the CNTs are uniformly dispersed. Since the whole length of the sample roughly coincides with the theoretical length, it is thought that similar to the raw material powder, the preferable powder compact having no internal void is formed.

[Extrusion of Cnt-coated Az31B Powder Compact]

An investigation was made of a connection between a condition of the heat treatment for the CNT-coated AZ31B magnesium alloy powder particles, and a tensile strength of an extruded powder compact thereof provided through an extrusion process. Table 1 shows the result of it.

TABLE 1

Tensile strength characteristics of extruded CNT-coated AZ31B powder
Examples of the present invention; A to D

| | A | B | C | D | E | F | G |
|---|---|---|---|---|---|---|---|
| TS (MPa) | 288 | 292 | 280 | 283 | 209 | 198 | 254 |
| Elongation (%) | 23.5 | 24.2 | 28.4 | 29.2 | 3.4 | 2.6 | 17.8 |

A; Heat treatment in hydrogen gas (480° C. × one hour)
B; Heat treatment in hydrogen gas (550° C. × one hour)
C; Heat treatment in mixed gas (hydrogen gas 70% + nitrogen gas 30%) (480° C. × one hour)
D; Heat treatment in mixed gas (hydrogen gas 70% + nitrogen gas 30%) (550° C. × one hour)
E; Heat treatment in atmosphere (480° C. × one hour)
F; Heat treatment in atmosphere (550° C. × one hour)
G; AZ31B raw material powder (no CNT coating)

Samples A to D in Table 1 are preferred examples of the present invention. These samples are extruded materials using the CNT-coated AZ31B magnesium alloy powder particles after subjected to a reduction treatment in an atmosphere containing hydrogen, as a starting raw material, and each shows preferable tensile strength (TS) and elongation. On the other hand, as for extruded materials (samples E and F) using the CNT-coated AZ31B magnesium alloy powder particles after subjected to a heat treatment in the atmosphere, as a starting raw material, both tensile strength characteristics and elongation characteristics are inferior. As for an extruded material of a sample G using the AZ31B raw material powder having no CNT coating, as a starting raw material, both tensile strength characteristics and elongation characteristics are inferior to those of the samples A to D.

Figure 23:
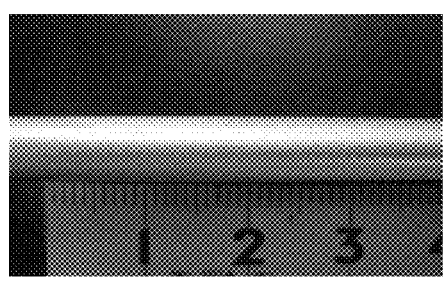
FIG. 23 is a photograph showing an outer appearance of an extruded material made of CNT-coated AZ31B powder (subjected to heat treatment at 480° C. for one hour in the atmosphere).

FIG. 23 is a photograph showing an outer appearance of the extruded material using the CNT-coated AZ31B powder (after subjected to the heat treatment in hydrogen gas at 480° C. for one hour). As can be clear from the photograph, a preferable extrusion process has been performed.

Figure 24:
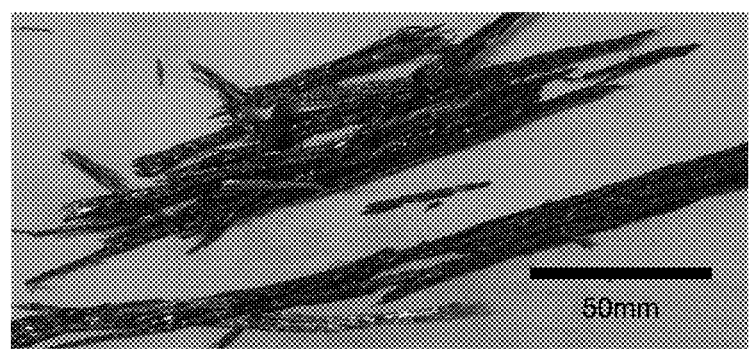
FIG. 24 is a photograph showing an outer appearance of an extruded material made of CNT-coated AZ31B powder (subjected to heat treatment at 480° C. for one hour in the atmosphere).

FIG. 24 is a photograph showing an outer appearance of the extruded material using the CNT-coated AZ31B powder (after subjected to the heat treatment in the atmosphere at 480° C. for one hour). As can be clear from the photograph, the powder is not solidified. This is attributed to the fact that the binder component adheres to the powder particle surface.

[Extrusion of CNT-coated Pure Copper Powder Compact]

An investigation was made of a connection between a heat treatment condition of CNT-coated pure copper powder particles, and a tensile strength of an extruded powder compact thereof. The result is shown in Table 2.

TABLE 2

Tensile strength characteristics of extruded CNT-coated pure copper powder
Examples of the present invention; A to B

|  | A | B | C | D | E |
|---|---|---|---|---|---|
| TS (MPa) | 139 | 141 | 94 | 103 | 122 |
| Elongation (%) | 41.4 | 37.8 | 5.7 | 4.6 | 39.4 |

A; Heat treatment in hydrogen gas (600° C. × one hour)
B; Heat treatment in hydrogen gas (800° C. × one hour)
C; Heat treatment in atmosphere(600° C. × one hour)
D; Heat treatment in atmosphere(800° C. × one hour)
E; Pure copper raw material powder (no CNT coating)

Samples A and B in Table 2 are preferred examples of the present invention. These samples are extruded materials using the CNT-coated pure copper powder particles after subjected to a reduction treatment in an atmosphere containing hydrogen, as a starting raw material, and each shows preferable tensile strength and elongation. On the other hand, as for extruded materials (samples C and D) using the CNT-coated AZ31B pure copper powder particles after subjected to the heat treatment in the atmosphere, as a starting raw material, their tensile strength characteristics and elongation characteristics are inferior. As for an extruded material of a sample E using the pure raw material powder having no CNT coating, as a starting raw material, its tensile strength characteristics and the elongation characteristics are inferior to those of the samples A and B.

The inventor of the present invention further conducted additional experiments.

[Preparation of Cnt-dispersed Aqueous Solution]

First, 2.0 g of 3-(N,N-dimethylmyristylammonio)-propanesulfonate (zwitterionic surfactant), 2.0 g of polyoxyetylene distyrenated phenyl ether, 1.0 g of alkyl (14-18) dimethyl betaine, and 400 ml of deionization water were mixed to prepare an aqueous solution to disperse carbon nanotubes.

This aqueous solution was stirred once, and then the carbon nanotubes (having a diameter of 20 nm and a length of 1 to 5 μm, which is referred to as the CNT hereinafter) were added thereto. At this time, the CNTs were added such that a concentration of the CNTs became 3 mass %, and then the aqueous solution was put into a ball mill body together with zirconium beads, to gently stir the solution for eight hours, whereby a primary dispersion liquid (coarse dispersion liquid) containing the carbon nanotubes was produced. Then, this aqueous solution was subjected to an ultrasonic washing treatment for one hour, whereby a secondary dispersion liquid containing the monodispersed CNTs (hereinafter, referred to as the CNT dispersed liquid) was prepared.

[Preparation of Row Material Powder]

As metal powders coated with the CNTs, the following powders were prepared, that is, a pure magnesium (Mg) powder, a pure copper (Cu) powder, a pure titanium (Ti) powder, and a copper alloy powder were prepared.

First, as the pure Mg powder, two kinds of powders such as a coarse powder (purity; 99.9%, and average particle diameter; 1.47 mm) produced by a grinding method, and a fine powder (purity; 99.9%, and average particle diameter; 155 μm) produced by an atomizing method were used. As the pure Cu powder, a powder having purity of 99.8% and an average particle diameter of 178 μm was used. As the pure Ti powder, a sponge titanium powder (purity; 99.9%, and average particle diameter; 697 μm) was used. As the copper alloy powder, a Cu-40% Zn brass powder (Zn; 39.8%, Fe; 0.12%, and average particle diameter; 40 μm) was used.

[Method for Coating Each Metal Powder Surface with CNTS]

A method for coating the surface of each metal powder with the CNTs was the same as follows. First, the metal powder was soaked in the above CNT dispersion liquid for three minutes and the powder was taken out of the dispersion liquid. At this time, a strainer or a net having a mesh interval smaller than a powder particle diameter was used. The collected powder was heated and retained at 110° C. for two hours in an argon atmosphere in a muffle furnace to evaporate water existing on the powder surface. Thus, multilayer CNTs uniformly adhere to the surface of the metal powder (hereinafter referred to as the CNT-coated powder) in the monodispersed state.

[Method for Hot Solidifying CNT-coated Mg Powder]

CNT-coated Mg powders were prepared from the above two kinds of pure Mg powders, and a sintered body was produced from each powder by solid-state sintering as a primary sintering process at a degree of vacuum of $1 \times 10^{-4}$ Pa or less, under a pressure of 30 MPa, at a sintering temperature of 550° C. for a retention time of 30 minutes, in a discharge plasma sintering machine. Then, a secondary sintering process (at a degree of vacuum of $1 \times 10^{-4}$ Pa or less, in no-pressure state, at a sintering temperature of 700° C. for a retention time of 20 minutes) was performed to obtain an extruding Mg powder sintered billet in which the CNTs were monodispersed.

Each billet was heated to 400° C. and a hot extruding process was performed at an extrusion ratio of 37, whereby a round bar having a diameter of 7 mm was obtained.

After analyzing the carbon in each of the extruded material, a CNT content was 0.52 mass % when the coarse pure Mg powder was used, and it was 0.80 mass % when the fine pure Mg powder was used.

[Method for Hot Solidifying CNT-coated Cu Powder]

A CNT-coated Cu powder was prepared from the above pure Cu powder, and a sintered body was produced from the powder by solid-state sintering as a primary sintering process at a degree of vacuum of $1 \times 10^{-4}$ Pa or less, under a pressure of 30 MPa, at a sintering temperature of 500° C. for a retention time of 30 minutes, in the discharge plasma sintering machine, and then a secondary sintering process (at a degree of vacuum of $1 \times 10^{-4}$ Pa or less, in no-pressure state, at a sintering temperature of 900° C. for a retention time of 20 minutes) was performed to obtain an extruding Cu powder sintered billet in which the CNTs were monodispersed.

The billet was heated to 800° C. and a hot extruding process was performed at an extrusion ratio of 36, whereby a round bar having a diameter of 10 mm was obtained. After analyzing the carbon in the extruded material, a CNT content was 0.52 mass %.

[Method for Hot Solidifying CNT-coated Ti Powder]

A CNT-coated Ti powder was prepared from the above sponge pure Ti powder, and the powder was solidified by solid-phase sintering at a degree of vacuum of $1 \times 10^{-4}$ Pa or less, under a pressure of 30 MPa, at a sintering temperature of 1000° C. for a retention time of 30 minutes, in the discharge plasma sintering machine to obtain an extruding Ti powder sintered billet in which the CNTs were monodispersed.

The billet was heated to 1000° C. and a hot extruding process was performed at an extrusion ratio of 37, whereby a round bar having a diameter of 7 mm was obtained. After analyzing the carbon in the extruded material, a CNT content was 0.72 mass %.

[Method for Hot Solidifying CNT-coated Brass Powder]

A CNT-coated brass powder was prepared from the above brass powder, and the powder was solidified by solid-phase sintering at a degree of vacuum of $1\times10^{-4}$ Pa or less, under a pressure of 30 MPa, at a sintering temperature of 780° C. for a retention time of 30 minutes, in the discharge plasma sintering machine to obtain an extruding brass powder sintered billet in which the CNTs were monodispersed.

The billet was heated to 800° C. and retained for 40 minutes and a hot extruding process was performed at an extrusion ratio of 36, whereby a round bar having a diameter of 10 mm was obtained. After analyzing the carbon in the extruded material, a CNT content was 0.84 mass %.

[Tensile Test of Extruded CNT-dispersed Mg Powder]

Tensile test specimens were prepared from the above two kinds of extruded CNT-dispersed Mg powders, and a tensile test was performed under the condition of strain rate of $5*10^{-4}$/s at room temperature. Table 3 shows a result of it together with, by way of comparison, results of materials obtained by solidifying a raw material pure Mg powder containing no CNT, and a mixed powder of the CNT and the fine pure Mg powder produced by the conventional mechanical mixing method in the ball mill, under the same condition as the above.

TABLE 3

| | Tensile strength (MPa) | Tensile resistance (MPa) | Young's modulus (GPa) |
|---|---|---|---|
| Example of present invention (CNT; 0.52%) | 225 | 181 | 59 |
| Example of present invention (CNT; 0.8%) | 242 | 201 | 68 |
| Comparison example (CNT; 0%) | 197 | 141 | 42 |
| Comparison example (CNT; 0.52%) | 172 | 132 | 43 |
| Comparison example (CNT; 0.8%) | 154 | 144 | 42 |

As shown in Table 3, it is confirmed that tensile resistance, tensile strength, and Young's modulus are increased by dispersing the CNTs by the method according to the present invention. On the other hand, according to the conventional ball mill mixing method, since the CNTs cannot be prevented from being aggregated and segregated and that part causes a metal defect, the strength is lowered.

Figure 25:
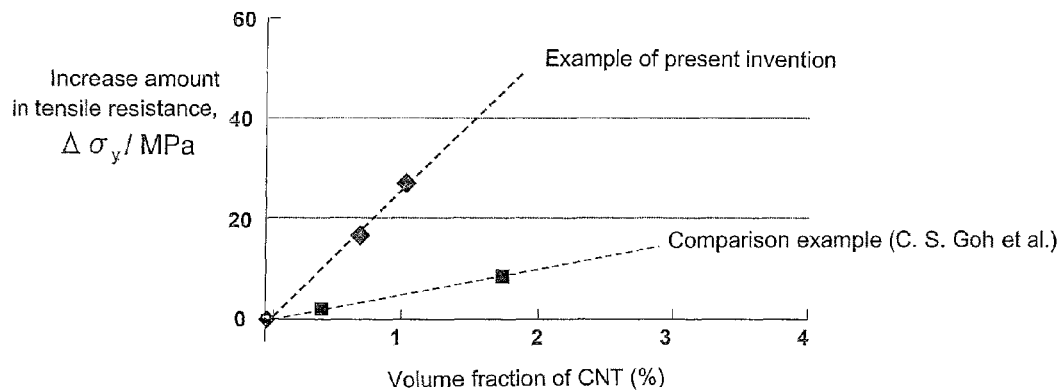
FIG. 25 is a view showing a relationship between a CNT content and an increase in tensile resistance, in an extruded Mg powder.

FIG. 25 shows a relationship between a CNT content and an increase in tensile resistance. Here, it also shows a result obtained from data of a document (C. S. Goh, J. Wei, L. C. Lee, M. Gupta; Material Science and Engineering A 423, 2006 153-156), and tensile strength characteristics of an extruded material obtained by dispersing the CNTs in Mg powder by the mechanical mixing method, as a conventional technique. As compared with the extruded Mg of the comparison example using the conventional technique, the sample according to this study shows high tensile resistance, so that the effectiveness of this method can be confirmed. In addition, according to this production method, the resistance increases as the CNT content increases.

[Thermal Conductivity of Extruded CNT-dispersed Cu Powder]

A disk-shaped sample (diameter; 10 mm, and thickness; 2 mm) was obtained from the above extruded CNT-dispersed pure Cu powder by a machining process, and its thermal conductivity at room temperature was measured. By way of comparison, thermal conductivity of an extruded pure Cu powder containing no CNT was measured under the same condition.

The thermal conductivity of the extruded pure Cu powder containing no CNT is 398 W/(m·K) which almost coincides with a theoretical value (390 W/(m·K)). Meanwhile, according to the production method of the present invention, it is 526 W/(m·K), so that a considerable increase in thermal conductivity is confirmed due to the addition of the CNTs. In addition, 0.52 mass % of CNTs was mixed with the pure Cu powder by the conventional method in a dry ball mill, and an extruded CNT-dispersed pure Cu powder was produced from the obtained mixed powder under the same condition, and then its thermal conductivity was measured. As a result, the thermal conductivity is 38.6 W/(m·K), and the effect due to addition of the CNTs cannot be confirmed.

[Tensile Test of Extruded CNT-dispersed Ti Powder]

Figure 26:
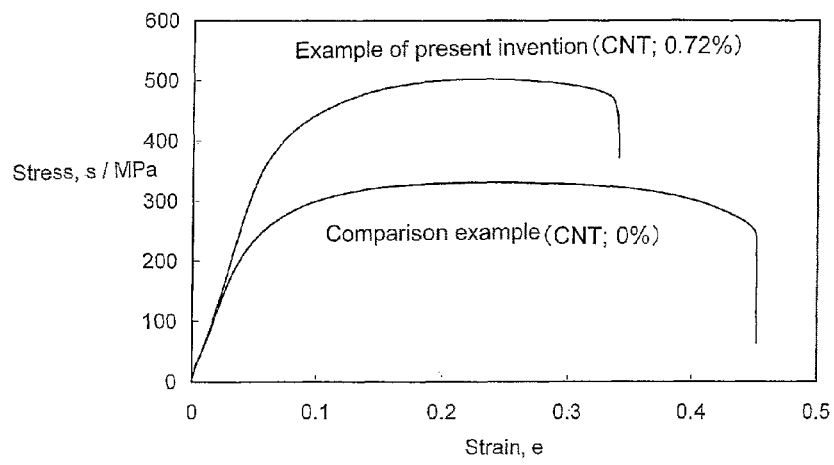
FIG. 26 is a view showing one example of a stress-strain curve in an extruded Ti powder.

A tensile test specimen was produced from the above extruded CNT-dispersed Ti powder, and a tensile test was performed under the condition of strain rate of $5*10^{-4}$/s at room temperature. FIG. 26 shows one example of a stress-strain curve. By way of comparison, it also shows a result of a material obtained by solidifying a raw material pure Ti sponge powder containing no CNT under the same condition as the above. In addition, results of tensile strength, tensile resistance and breaking elongation are shown in Table 4.

TABLE 4

| | Tensile strength (MPa) | Tensile resistance (MPa) | Breaking elongation (%) |
|---|---|---|---|
| Example of present invention (CNT; 0.72%) | 496 | 332 | 31.5 |
| Comparison example (CNT; 0%) | 319 | 216 | 41.6 |
| Comparison example (CNT; 0.72%) | 241 | 188 | 15.2 |

As shown in FIG. 26 and Table 4, the tensile resistance and the tensile strength are considerably improved by containing the CNTs. Here, Table 4 also shows a tensile test result of a material obtained by mixing the pure Ti powder and the CNTs by a simple mixing method in the ball mill and solidifying and extruding the mixture under the same condition. As can be seen from this table, according to the method of the present invention, the strength of the extruded Ti is considerably increased because the CNTs are monodispersed without being aggregated and segregated. On the other hand, according to the conventional mixing method, the strength and elongation are even lowered because of the aggregated CNTs.

[Thermal Conductivity of Extruded CNT-dispersed Brass Powder]

A disk-shaped sample (diameter; 10 mm, and thickness; 2 mm) was obtained from the above extruded CNT-dispersed brass powder by a machining process, and its thermal conductivity at room temperature was measured. By way of comparison, thermal conductivity of an extruded brass powder containing no CNT was measured under the same condition.

The thermal conductivity of the extruded brass powder containing no CNT is 106.4 W/(m·K) which almost coincides with a value (109 W/(m·K)) reported in documents. Meanwhile, according to the production method of the present invention, it is 133.3 W/(m·K), so that a considerable increase in thermal conductivity was confirmed due to the addition of the CNTs.

In addition, 0.84 mass % of CNTs was mixed with the brass powder by the conventional method in the dry ball mill, and an extruded CNT-dispersed brass powder was produced under the same condition from the obtained mixed powder, and then its thermal conductivity was measured. As a result, the thermal conductivity is 102.2 W/(m·K), so that the effect due to addition of the CNT cannot be confirmed.

[Experiment of Adhesion of CNTs to Titanium Powder]

(1) Raw Material Powder

A sponge titanium powder (purity; 99.9%, and average particle diameter; 697 μm) and a fine spherical titanium powder (purity; 99.7%, and average particle diameter; 163 μm) were used as pure titanium powders.

(2) Method for Coating Titanium Powder Surface with CNTs

First, the titanium powder was soaked in the above CNT dispersed liquid for three minutes and the powder was taken out of the dispersion liquid. At this time, a strainer or a net having a mesh interval smaller than a powder particle diameter was used. The collected powder was heated and retained at 110° C. for two hours in an argon atmosphere in the muffle furnace to evaporate water existing on the powder surface. Thus, a powder to which monodispersed multilayer CNTs uniformly adhere was obtained. Hereinafter, this is referred to as the "CNT-coated powder".

(3) Method for Hot Solidifying CNT-coated Ti Powder

Two kinds of CNT-coated Ti powders were prepared from the above two kinds of pure Ti powders, and each powder was subjected to a heat treatment in an atmosphere of a mixed gas of argon and hydrogen (flow rate was 1:1). The heat treatment was performed at 600° C. for a retention time of 30 minutes. A solid component of a surfactant adhering to the powder surface was thermally decomposed by this heat treatment. Then, solid-state sintering was performed for each powder under a pressure of 30 MPa, at a sintering temperature of 1000° C. for a retention time of 30 to 120 minutes in the discharge plasma sintering machine, whereby an extruding Ti powder sintered billet was produced. The CNTs are dispersed in the monodispersed state in the sintered billet.

The billet was heated to 1000° C. and retained for 3 minutes and then a hot extruding process was performed at an extrusion ration of 37, whereby a round bar having a diameter of 7 mm was obtained. After analyzing carbon in each of the extruded material, a CNT content is 0.28 mass % when the sponge Ti powder was used, and it is 0.38 mass % when the fine spherical Ti powder was used. Tensile test specimens were prepared from the extruded CNT-dispersed Ti powders, and a tensile test was performed under the condition of strain rate of $5\times10^{-4}$/s at room temperature.

(4) Adjustment in Production Amount of Titanium Carbide

Reactivity between the CNT and the Ti powder was controlled by changing the retention time within a range of 30 to 120 minutes, at the sintering temperature of 1000° C. in the discharge plasma sintering process, to adjust a production amount of synthesized titanium carbide (TiC).

The production amount of TiC was evaluated with diffraction peak strength of TiC by X-ray diffraction. More specifically, a discharge plasma sintering process was performed at 1200° C. for 120 minutes to produce a reference material. In the produced reference material, all CNTs react with Ti to produce TiC and there is no monodispersed CNT. A TiC diffraction peak strength of the reference material was set to 100, and the TiC production amount was quantitatively evaluated with a TiC peak strength in each extruded material with respect to the above value.

Table 5 shows a relationship between a tensile test result and a peak strength ratio of each extruded material. In addition, the material whose peak strength ratio is 0 is an extruded pure titanium powder to which the CNTs are not added. As can be clear from Table 5, the tensile strength is lowered when all CNTs are consumed to generate TiC in each titanium powder. However, when the TiC and CNT are mixed and dispersed, the tensile strength is increased. Especially, when 20 to 50% of CNTs adhering to the powder surface contributes to the TiC production (CNT dispersed amount; 80 to 50%), the tensile strength is further improved because of reinforced composite dispersion of the CNTs and TiC.

TABLE 5

| (1) Sponge Ti powder | | | | | | | | |
|---|---|---|---|---|---|---|---|---|
| Sintering temperature (° C.) | 1000 | 1000 | 1000 | 1000 | 1000 | 1000 | 1000 | 1200 |
| Retention time (min) | 30 | 30 | 45 | 60 | 80 | 100 | 120 | 120 |
| TiC peak strength ratio | 0 | 8 | 22 | 33 | 48 | 64 | 78 | 100 |
| Tensile strength (MPa) | 348 | 511 | 528 | 544 | 539 | 522 | 519 | 503 |
| (2) Fine spherical Ti powder | | | | | | | | |
| Sintering temperature (° C.) | 1000 | 1000 | 1000 | 1000 | 1000 | 1000 | 1000 | 1200 |
| Retention time (min) | 30 | 30 | 45 | 60 | 80 | 100 | 120 | 120 |
| TiC peak strength ratio | 0 | 6 | 18 | 25 | 41 | 58 | 71 | 100 |
| Tensile strength (MPa) | 578 | 749 | 776 | 798 | 792 | 778 | 756 | 731 |

[Experiment on Adhesion of Carbon Black to Titanium Powder]

(1) Raw Material Powder

The fine spherical titanium powder (purity; 99.7%, and average particle diameter; 163 μm) was used as a raw material. An average particle diameter of a carbon black used instead of the CNT is 1.25 μm.

(2) Method for Coating Powder Surface with Carbon Black Particles

First, the titanium powder was soaked in a carbon black dispersed liquid for three minutes and the powder was taken out of the dispersion liquid. The carbon black dispersed liquid was provided by using the carbon black particles instead of the CNTs in the method for producing the dispersion liquid, and the other conditions to produce the dispersion liquid including the concentration were all the same as the above. When the powder was taken out of the dispersion liquid, a strainer or a net having a mesh interval smaller than a powder particle diameter was used.

The powder collected by the strainer or net was heated and retained at 110° C. for two hours in an argon atmosphere in the muffle furnace to evaporate water existing on the powder surface. Thus, the carbon black particles uniformly adhere to the titanium powder without being aggregated.

(3) Method for Hot Solidifying Ti Powder Coated with Carbon Black particles

The Ti powder coated with the carbon black particles was subjected to a heat treatment in an atmosphere of a mixed gas of argon and hydrogen (flow rate was 1:1) to thermally decompose a solid component adhering to the powder surface. The heat treatment was performed at 600° C. for a retention time of 30 minutes.

Then, solid-state sintering was performed for the powder under a pressure of 30 MPa, at a sintering temperature of 1000° C. for a retention time of 30 to 100 minutes in the discharge plasma sintering machine, whereby an extruding Ti powder sintered billet was produced. The carbon black particles are dispersed in the monodispersed state in the sintered billet.

The billet was heated to 1000° C. and retained for 3 minutes and then a hot extruding process was performed at an extrusion ration of 37, whereby a round bar having a diameter of 7 mm was obtained. After analyzing carbon in the extruded material, it is 0.45 mass % and this is a content of the carbon black particles. A tensile test specimen was prepared from the extruded Ti powder in which the carbon black particles were dispersed and a tensile test was performed under a condition of a strain rate of $5 \times 10^{-4}$/s at room temperature.

(4) Adjustment in Production Amount of Titanium Carbide

A production amount of TiC was quantified with TiC diffraction peak strength by the same method as that of the above experiment. Table 6 shows a relationship between a tensile test result and a TiC peak strength ratio of each extruded material. In addition, the material whose peak strength ratio is 0 is an extruded pure titanium powder to which the carbon black particles are not added.

As can be clear from Table 6, when the carbon black particles are uniformly dispersed in the extruded Ti powder, the tensile strength is increased. In addition, the strength is further increased by increasing the TiC amount produced by a reaction between the carbon black particles and Ti.

TABLE 6

| Sintering temperature (° C.) | 1000 | 1000 | 1000 | 1000 | 1000 | 1000 | 1200 |
|---|---|---|---|---|---|---|---|
| Retention time (min) | 30 | 30 | 45 | 60 | 80 | 100 | 120 |
| TiC peak strength ratio | 0 | 14 | 31 | 48 | 62 | 78 | 100 |
| Tensile strength (MPa) | 578 | 668 | 687 | 695 | 676 | 652 | 644 |

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be advantageously applied to a technique to obtain a metal material superior in strength characteristics.

The invention claimed is:

1. A method for producing a composite metal material comprising:
   a step of preparing a solution containing a surfactant having both hydrophilicity and hydrophobicity;
   a step of dispersing a nanosized to micro-sized fine carbonaceous substance into a state of being monodispersed in said solution;
   a step of bringing said solution having said dispersed fine carbonaceous substance into contact with a surface of a metal powder particle;
   a step of drying said fine metal powder particle to make said fine carbonaceous substance in the monodispersed state adhere to the surface of said metal powder particle via a component of said solution; and
   a step of thermally decomposing and removing said solution component adhering to the surface of the metal powder particle by heat-treating said metal powder particle either in a hydrogen-containing reducing atmosphere or in a vacuum atmosphere to partially expose the surface of the metal powder particle out of the adhering fine carbonaceous substance, and thus progress diffusion and sintering among the metal powder particles through exposed parts.

2. The method for producing the composite metal material according to claim 1, further comprising a step of extruding a metal powder particle compact produced after progressing said diffusion and sintering.

3. The method for producing the composite metal material according to claim 1, wherein
   said heat treatment is performed at a temperature of 450° C. or higher.

4. The method for producing the composite metal material according to claim 1, wherein
   a material of said metal powder particle is a metal selected from a group consisting of magnesium, copper, aluminum, and titanium or an alloy of them.

5. The method for producing the composite metal material according to claim 1, wherein
   said fine carbonaceous substance is a substance selected from a group consisting of a carbon nanotube, carbon nanofiber, fullerene, and carbon black.

6. The method for producing the composite metal material according to claim 1, further comprising a step of generating a metal carbide by reacting a part of said fine carbonaceous substance adhering to the metal powder particle surface, with the metal of the powder particle through said heat treatment.

7. The method for producing the composite metal material according to claim 6, wherein
   said metal powder particle comprises titanium or a titanium alloy, and
   said metal carbide comprises a titanium carbide.

8. The method for producing the composite metal material according to claim 6, wherein
   said metal powder particle comprises titanium or a titanium alloy,
   said metal carbide comprises a titanium carbide, and
   said heat treatment is performed under a condition selected to generate a titanium carbide with 20 to 50% of the fine carbonaceous substance adhering to said metal powder particle surface.

* * * * *